US010546341B2

(12) United States Patent
Blatstein et al.

(10) Patent No.: US 10,546,341 B2
(45) Date of Patent: Jan. 28, 2020

(54) SYSTEM, COMPUTER-READABLE STORAGE MEDIUM, AND METHOD FOR OPERATION MANAGEMENT

(71) Applicant: Flo Solutions, LLC, New York, NY (US)

(72) Inventors: Eric J. Blatstein, New York, NY (US); Albert C. Lee, New York, NY (US); Michael Palamara, Cedar Grove, NJ (US); John Saya, Secaucus, NJ (US); Neville Kadwa, Livingston, NJ (US); Nicholas Haurus, New York, NY (US); Matthew Quirk, Bloomfield, NJ (US)

(73) Assignee: Flo Solutions, LLC, New York, NY (US)

( * ) Notice: Subject to any disclaimer, the term of this patent is extended or adjusted under 35 U.S.C. 154(b) by 0 days.

(21) Appl. No.: 14/870,658

(22) Filed: Sep. 30, 2015

(65) Prior Publication Data
US 2016/0092972 A1 Mar. 31, 2016

Related U.S. Application Data

(63) Continuation-in-part of application No. 14/689,590, filed on Apr. 17, 2015.
(Continued)

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0635* (2013.01); *G06Q 10/083* (2013.01); *G06Q 30/0623* (2013.01); *G06Q 30/0639* (2013.01); *G06Q 30/0641* (2013.01)

(58) Field of Classification Search
CPC . G06Q 30/0601–0645; G06Q 30/0635; G06Q 30/0641; G06Q 30/0639; G06Q 30/0623; G06Q 10/083
(Continued)

(56) References Cited

U.S. PATENT DOCUMENTS 6,384,850 B1   5/2002   McNally et al.
6,473,739 B1   10/2002  Showghi et al.
(Continued)

FOREIGN PATENT DOCUMENTS

JP    2012-64168 A    3/2012
JP    2014-38555      2/2014
(Continued)

OTHER PUBLICATIONS

Mack, Lauren. Gate Gourmet: Travel App Brings Food Delivery to Airport Terminals. Jun. 18, 2012 (Jun. 18, 2012). Published by the Daily Meal. Accessible via https://www.thedailymeal.com/gate-gourmet-travel-app-brings-food-delivery-airport-terminals. (Year: 2012).*

*Primary Examiner* — Jeffrey A. Smith
*Assistant Examiner* — Allison G Wood
(74) *Attorney, Agent, or Firm* — BakerHostetler

(57) ABSTRACT

Described herein are systems, methods, and apparatus for managing operations, for instance making orders and fulfilling orders, using one or more computing devices. In accordance with an example embodiment, an operations management system can include a self-order system, a self-payment system, and an order-fulfillment system. The self-order system, the self-payment system, and the order-fulfillment system can communicate with each other via a communication system that connects the systems, such as a wireless network for example. Using the operation manage-
(Continued)

ment system, orders can be placed and fulfilled efficiently and with minimal personal interaction.

21 Claims, 33 Drawing Sheets

Related U.S. Application Data

(60) Provisional application No. 62/057,691, filed on Sep. 30, 2014.

(58) Field of Classification Search
USPC ...... 705/26.1–27.2, 26.61, 26.8, 26.81, 26.9, 705/27.1, 330
See application file for complete search history.

(56) References Cited

U.S. PATENT DOCUMENTS

| | | | |
|---|---|---|---|
| 6,871,325 | B1 | 3/2005 | McNally et al. |
| 6,920,431 | B2 | 7/2005 | Showghi et al. |
| 6,982,733 | B1 | 1/2006 | McNally et al. |
| 7,454,370 | B2 | 11/2008 | Baril et al. |
| 7,831,475 | B2 | 11/2010 | Baril et al. |
| 7,945,477 | B2 | 5/2011 | Werbitt |
| 8,146,077 | B2 | 3/2012 | McNally et al. |
| 8,682,729 | B2 | 3/2014 | Werbitt |
| 2002/0115435 | A1 | 8/2002 | Soh |
| 2003/0050854 | A1* | 3/2003 | Showghi ............ G06Q 10/02 705/15 |
| 2004/0068441 | A1* | 4/2004 | Werbitt ............ G06Q 20/20 705/16 |
| 2004/0143503 | A1 | 7/2004 | Suthar |
| 2004/0210621 | A1 | 10/2004 | Antonellis |
| 2006/0085265 | A1 | 4/2006 | Dietz et al. |
| 2006/0178943 | A1* | 8/2006 | Rollinson ......... G06Q 30/0601 705/26.1 |
| 2007/0061209 | A1 | 3/2007 | Jackson |
| 2009/0192898 | A1 | 7/2009 | Baril |
| 2009/0281903 | A1* | 11/2009 | Blatstein ............ G06Q 20/20 705/15 |
| 2011/0173092 | A1 | 7/2011 | Werbitt |
| 2011/0231266 | A1 | 9/2011 | Baril |
| 2013/0097038 | A1 | 4/2013 | Potter et al. |
| 2013/0144731 | A1 | 6/2013 | Baldwin et al. |
| 2013/0246197 | A1 | 9/2013 | Baril |
| 2013/0332208 | A1 | 12/2013 | Mehta |

FOREIGN PATENT DOCUMENTS

| | | |
|---|---|---|
| WO | WO 00/68856 | 11/2000 |
| WO | WO 02/17537 | 2/2002 |
| WO | WO 2005/015463 | 2/2005 |

* cited by examiner

900

908

1500

1600

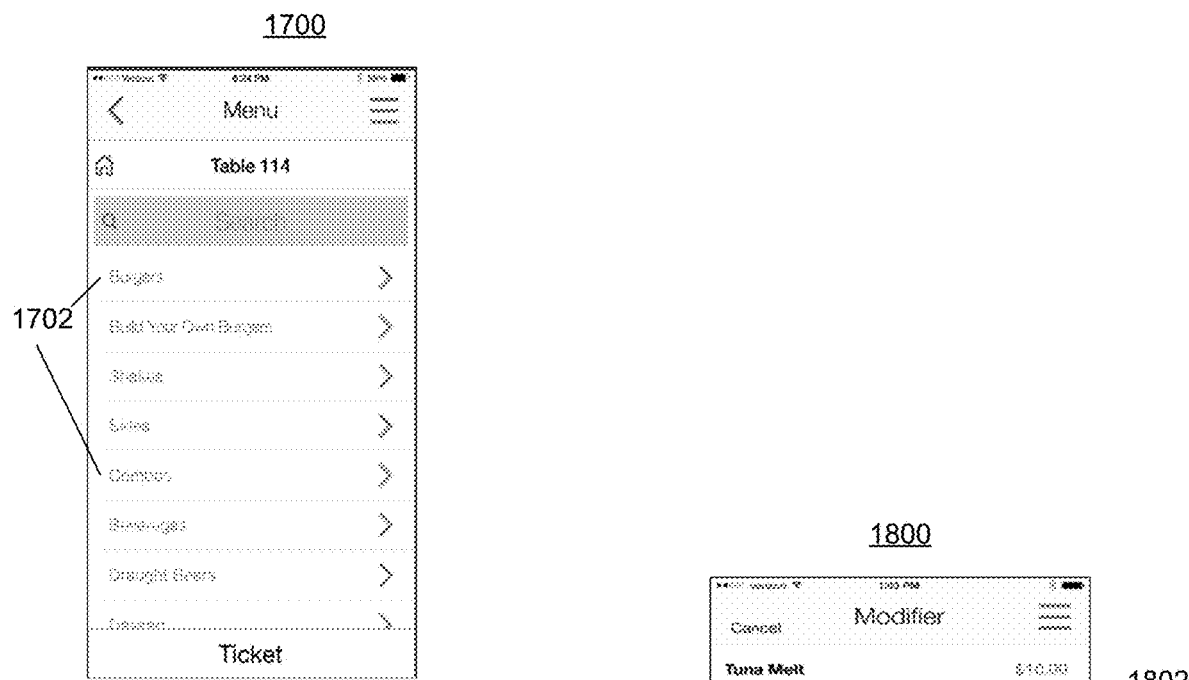
Fig. 17
Fig. 18
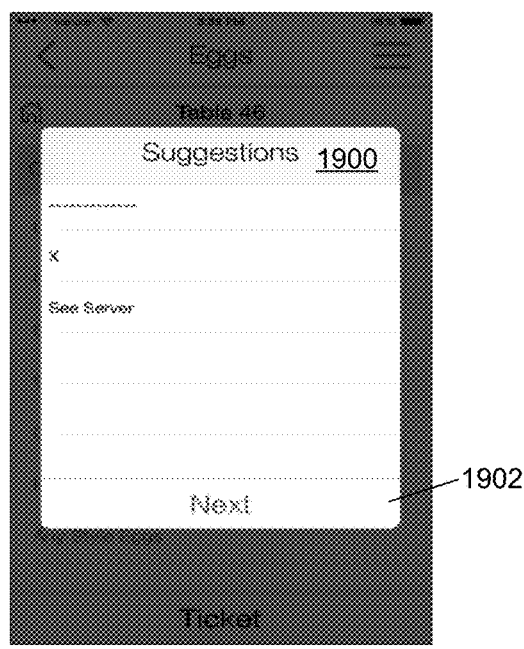
Fig. 19

SYSTEM, COMPUTER-READABLE STORAGE MEDIUM, AND METHOD FOR OPERATION MANAGEMENT

CROSS REFERENCE TO RELATED APPLICATIONS

This application claims the benefit of U.S. Provisional Patent Application Ser. No. 62/057,691, filed Sep. 30, 2014, and U.S. patent application Ser. No. 14/689,590 filed Apr. 17, 2015, the disclosures of both of which are hereby incorporated by reference as if set forth in their respective entireties herein.

BACKGROUND

In a closed retail environment, such as a standalone shop, stadium, shopping mall, or airport for example, customers can typically purchase items from different stores or concessions stands. Thus, buying decisions are often made based on customer convenience. For example, the further away a customer is from a product, the less likely the customer may be to become aware of the product, and thus the less likely the customer is to purchase the product. Models exist that allow customers to order goods from a remote location, and thus the remote location may be referred to as an order fulfillment location. As used herein, a remote location may refer to any location that is not physically proximate to a given customer. By way of example, U.S. Pat. Nos. 7,945,477 and 6,473,739 describe systems in which patrons can order from a tablet ordering device. In the aforementioned systems, it appears that a user must authenticate into the system and remain assigned to a device through an account, which requires several steps for the customer. An additional drawback of these systems appears to be that users are tied to their assigned device, and thus users cannot move freely between devices.

In a fast-paced environment, such as an airport or stadium for example, customers often lack time to go through numerous steps to buy products remotely. Requiring user accounts, pre-arranging payments, and/or escrowing payments can be barriers to making purchases. Existing approaches to remote ordering also often require large amounts of operational setup, such as, for example, hard-coded device identification, authentication, user account setup, and device and customer location determination. Further, existing systems often do not address challenges associated with fulfilling orders remotely in an enterprise environment that includes shared resources. Thus, existing remote ordering and ordering fulfillment systems lack efficiencies and capabilities.

SUMMARY

Described herein are systems, methods, and apparatus for managing operations, for instance making orders and fulfilling orders, using one or more computing devices. In accordance with an example embodiment, an operations management system can include a self-order system, a self-payment system, and an order-fulfillment system. The self-order system, the self-payment system, and the order-fulfillment system can communicate with each other via a communication system that connects the systems, such as a wireless network for example. Using the operation management system, orders can be placed and fulfilled efficiently and with minimal personal interaction.

In an example embodiment, an apparatus, for instance a server, includes a a processor and memory coupled to the processor. The memory comprises executable instructions that when executed by the processor cause the processor to effectuate operations. The operations can include receiving information associated with a customer. Based on the information associated with the customer, a menu that is specific to the customer can be generated. The menu can include one or more items that can be purchased by the customer. The operations can further include receiving an order that includes at least one selected item of the one or more items. The operations can further include identifying a delivery station disposed proximate to the customer, and sending a request to the identified delivery station. The request can be indicative of the at least one selected item and a location associated with the customer. The operations can further include receiving a verification when the at least one selected item is delivered to the customer.

BRIEF DESCRIPTION OF THE DRAWINGS

The foregoing summary, as well as the following detailed description of example embodiments of the present disclosure, will be better understood when read in conjunction with the appended drawings. For the purposes of illustrating the example embodiments of the present disclosure, references to the drawings are made. It should be understood, however, that the application is not limited to the precise arrangements and instrumentalities shown. In the drawings:

FIG. 17 is a screen shot of an example menu page;

FIG. 18 is a screen shot of an example modifier page;

FIG. 19 is a screen shot that shows an example suggestion box;

FIG. 27 is a screen shot of an example refund page;

FIG. 28 is a screen shot of an example reason page;

DETAILED DESCRIPTION OF ILLUSTRATIVE EMBODIMENTS

Figure 1:
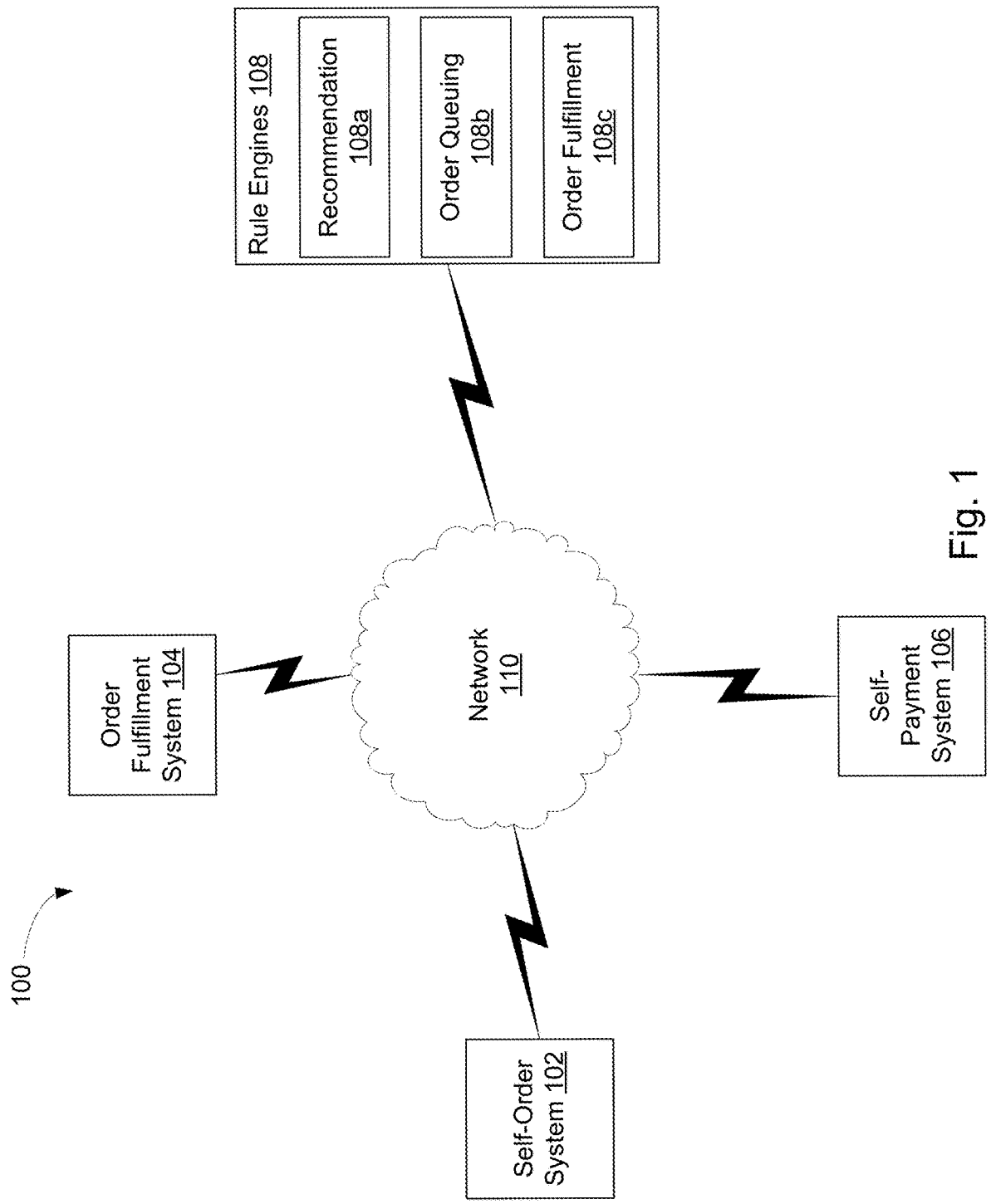
FIG. 1 is a block diagram of an example operations management system in accordance with an example embodiment, wherein the operations management system includes a self-order system, an order fulfillment system, a self-payment system, and one or more business rule engines.

Described herein are systems, methods, and apparatus for managing operations, for instance making orders and fulfilling orders, using one or more computing devices. Referring initially to FIG. 1, an operations management system 100 can include an ordering (or order) system 102, a payment system 106, and an order-fulfillment system 104. The ordering system 102 may allow a customer to make orders without assistance from staff, and therefore the ordering system 102 may be configured as a self-ordering (or self-order) system 102. Similarly, the payment system 106 may allow a customer to make payments without assistance from staff, therefore the payment system may be configured as a self-payment system 106. The ordering system 102, the payment system 106, and the order-fulfillment system 104 can communicate with each other via a communication system that connects the systems, such as a network 110. The operations management system 100 can further include one or more rule engines, for instance business rule engines that can be accessed via the network 110. Example rule engines 108 include, without limitation, a recommendation engine 108a, an order queuing engine 108b, and an order fulfillment engine 108c. For purposes of example, the operations management system 100 is often described below in the context of a restaurant or an airport, though it will be understood that the operations management system 100 can be implemented in any appropriate commercial setting as desired. For example, as applied to a restaurant, and as further described below, customers can use the operation management system 100 to view menu items, order particular menu items, and receive the ordered menu items without interacting with restaurant personnel. Further, continuing with the restaurant example, the restaurant can use the operations management system 100 to manage resources and tasks to fulfill orders.

FIGS. 2-5, and 7B (described hereinafter) illustrate various embodiments of methods and apparatus for managing operations. In these figures, various steps or operations are shown being performed by one or more clients, servers, and/or engines. It is understood that the clients, servers, and engines illustrated in these figures may represent logical entities in a communication network and may be implemented in the form of software (e.g., computer-executable instructions) stored in a memory of, and executing on a processor of, a node of such network, which may comprise one of the general architectures illustrated in FIG. 6A or 6B described below. That is, the methods illustrated in FIGS. 2-5, and 7B may be implemented in the form of software (e.g., computer-executable instructions) stored in a memory of a network node, such as for example the node or computer system illustrated in FIG. 6A or 6B, which computer executable instructions, when executed by a processor of the node, perform the steps illustrated in the figures. It is also understood that any transmitting and receiving steps illustrated in these figures may be performed by communication circuitry of the node under control of the processor of the node and the computer-executable instructions (e.g., software) that it executes.

Figure 2:
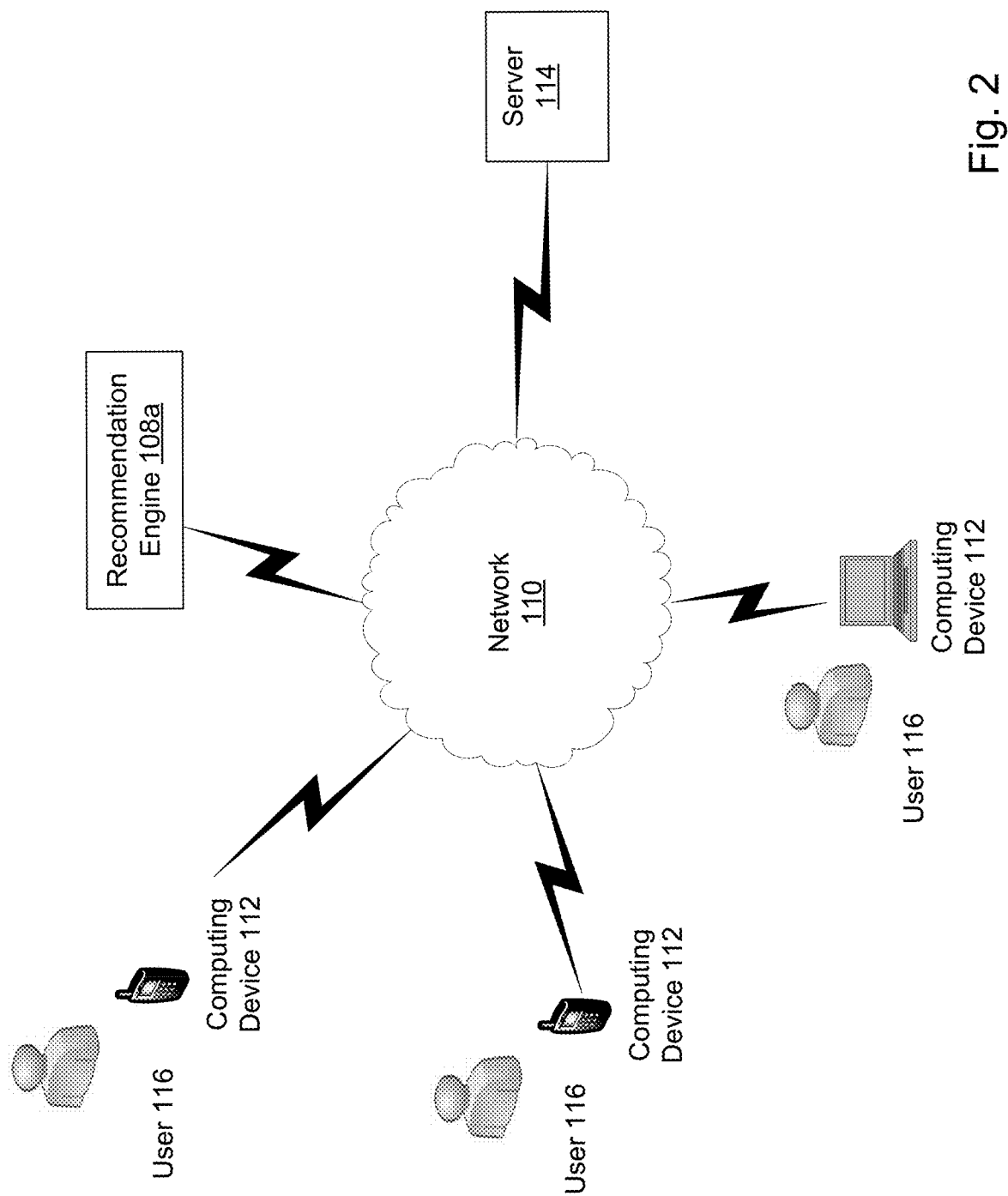
FIG. 2 is a block diagram of the self-order system depicted in FIG. 1 in accordance with an example embodiment.

Referring now to FIG. 2, in accordance with the illustrated embodiment, the ordering system 102 can include one or more computing devices 112 that communicate with the recommendation engine 108a and one or more servers via the network 110. FIG. 2 depicts one example of a suitable communication architecture for ordering items, such as items from a restaurant menu or products available in an airport, it being appreciated that numerous suitable alternative communication architectures are envisioned. It will further be appreciated that the example system 102 is simplified to facilitate description of the disclosed subject matter and is not intended to limit the scope of this disclosure. Other devices, systems, and configurations may be used to implement the embodiments disclosed herein in addition to, or instead of, the system 102, and all such embodiments are contemplated as within the scope of the present disclosure.

In an example embodiment, a client application may be installed onto one or more computing devices 112. Such an application may also be referred to as an ordering application or a customer application. Alternatively, the computing devices 112 may access the ordering application via the network 110, such as the Internet for example. Thus, in some cases, the ordering application may be referred to as a cloud-based ordering application. Using the ordering application, a given computing device 112 may transfer information to one or more servers, for instance a server 114. In an example embodiment, a server application is installed onto a computing device, such as the server 114. The server application can implement the rule engines 108 to transfer information to the computing devices 112, and in particular the ordering application.

In an example configuration, a user 116, who may also be referred to as a customer 116, may start the ordering application on a computing device 112 (e.g., a tablet or smart phone), for instance by selecting an icon that is displayed on the computing device 112. In an alternative configuration, a staff member (e.g., a waiter) may start the ordering application on a computing device 112, and may enter a customer's order via the ordering application. In an example embodiment, the server 114, and in particular the server application, can select items that are displayed by the computing device 112. The server 114 can determine which items to display to a given user 116 based on an identity of the user 116. The server 114 can identify items that are available for purchase based on various parameters, such as, for example, time of day, time of year, current quantity of a specific item, current resources that are available, or the like. For example, when the ordering system 102 is deployed in a restaurant setting, the server 114 can determine menu items (e.g., breakfast food, lunch food, or dinner food) to display to customers based on time of day. By way of further example, the server 114 can identify particular items for display based on current resources. If there is a restaurant staff shortage, the server 114 can select a limited menu as compared to a menu that the server selects when the restaurant staff is at full capacity. Similarly, the server 114 may select a particular food item for the computing device 112 to display based on capabilities of the kitchen staff. The server 114 can remove a particular item for purchase when a quantity of the particular item is less than a predetermined threshold, such as one (1) for example. It will be understood that the server 114 can select items for the computing devices 112 to display based on any parameter as desired so that the items are adjusted dynamically.

In some cases, the ordering system 102 can be implemented in an airport, and thus the rules engines 108 can select items to display for purchase based on parameters associated with flights. For example, the rules engines 108 can select particular flight times or statuses for display. In some cases that can be referred to as a "last call" scenario, the rules engines 108 can identify an item to render to a user at a predetermined time, wherein the predetermined time is based on a flight associated with the user. For example, the rules engine 108 can identify that a drink should be offered, and the computing device 112 can display the drink for purchase, at a time (e.g., 30 minutes) before the user's flight is scheduled to board or depart. The server 114 can receive real-time flight updates such that flight statutes that are displayed by the computing devices 112 are updated periodically and/or in response to changes. In an example embodiment, the server 114 can prompt a user to pay a tab based on a status of a flight associated with the customer. By way of example, at a predetermined time, for instance when a user's flight begins to board, the server 114 can send a message to the computing device 112 of the user 116 so that the computing device 112 informs the user 116 that his/her flight is boarding. The computing device 112 can render an audible alert, a visual alert, or the like.

Using the computing device 112, the customer 116 can view items that are available for purchase, and can select desired items for purchase without interacting with another person. In an example embodiment, as further described below, when the customer 116 selects an item for purchase, a message that indicates the selected item is sent from the computing device 112, via the network 110, to the order fulfillment system 104.

As should be appreciated, each of the parties set forth above and/or other relevant parties may operate any number of respective devices and may communicate internally and externally using any number of networks including, for example, wide area networks (WAN's) such as the Internet or local area networks (LAN's). The one or more servers 114 may be configured by a user, for instance an administrator.

Figure 4:
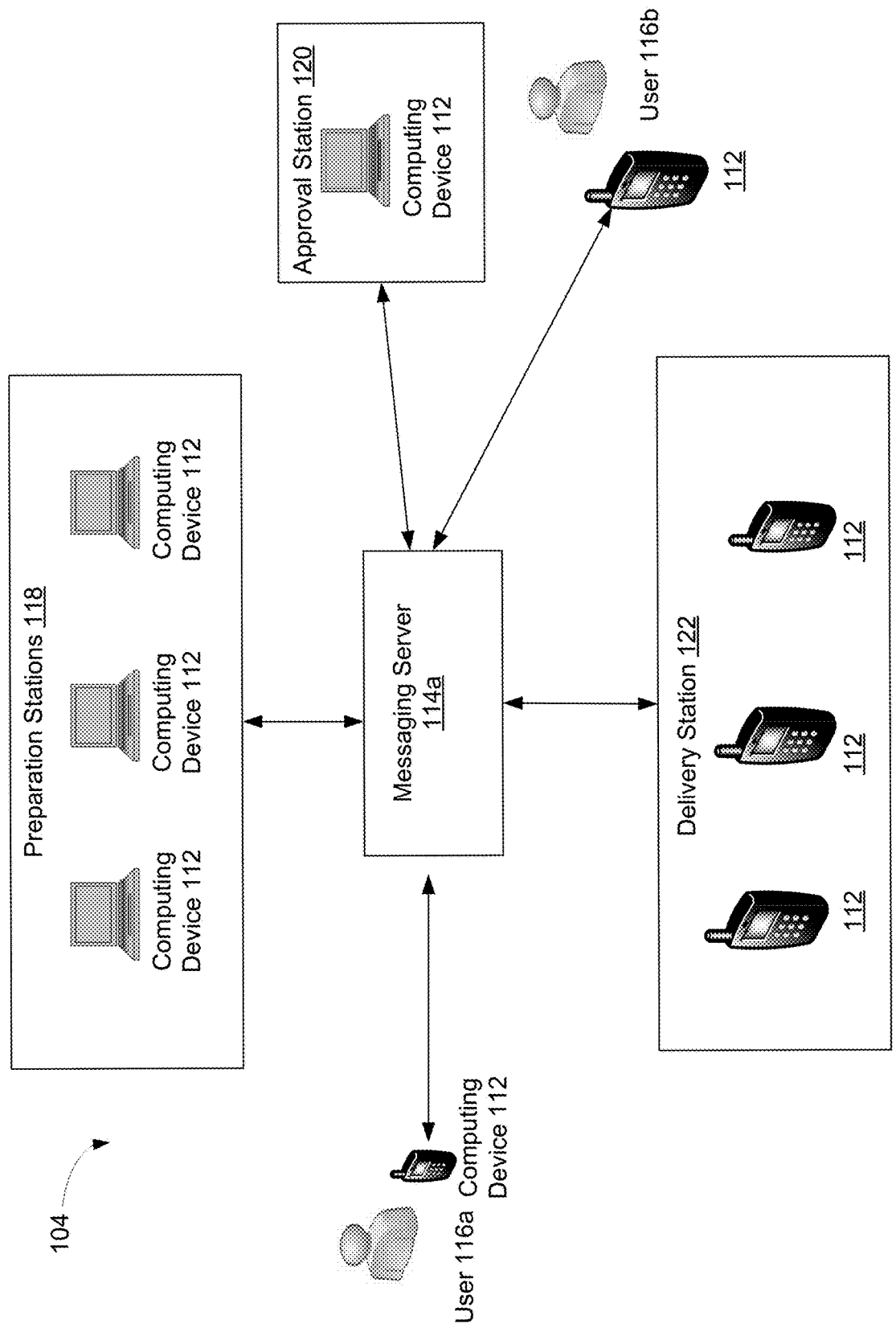
FIG. 4 is a block diagram of the order fulfillment system depicted in FIG. 1 in accordance with an example embodiment.
Figure 5:
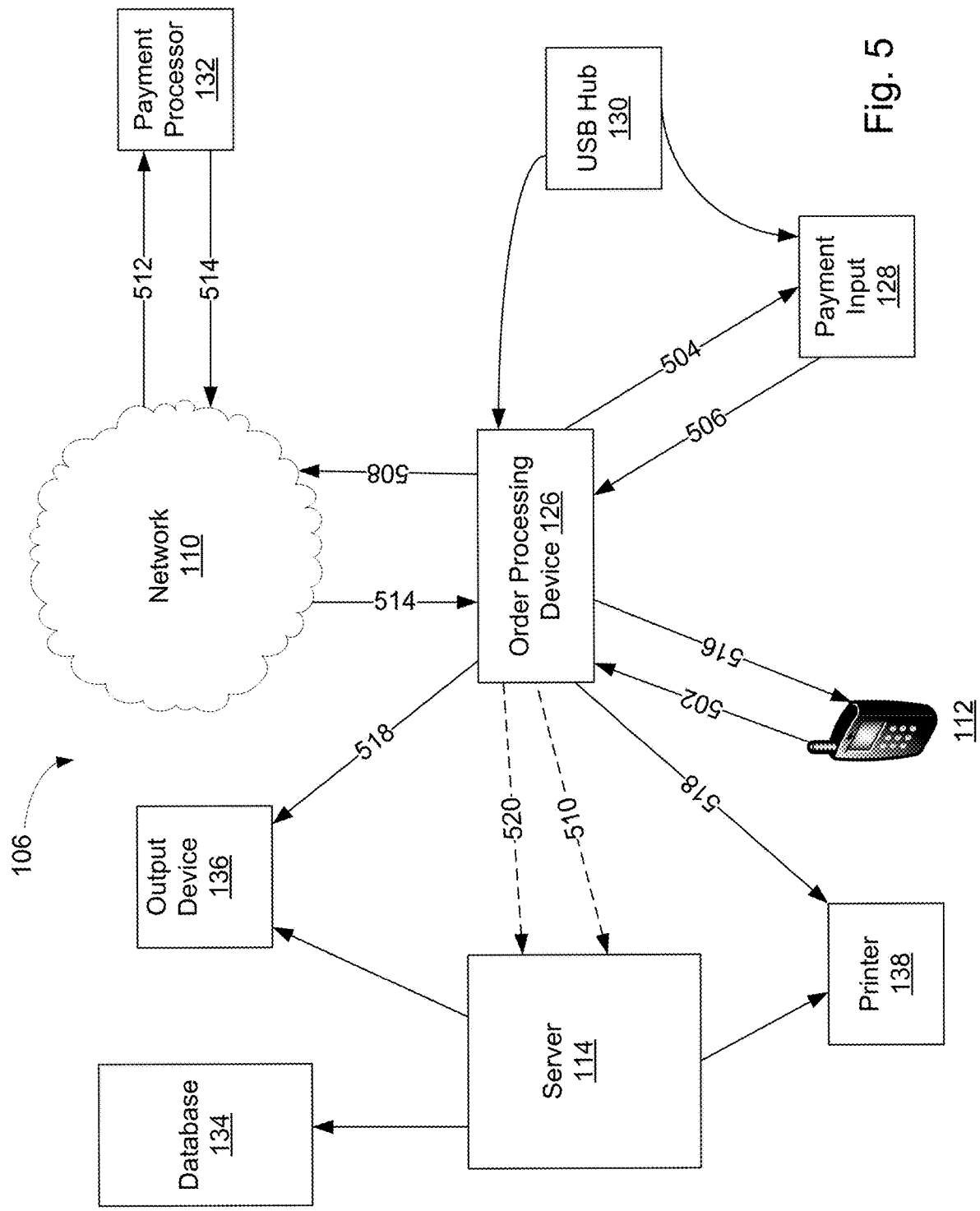
FIG. 5 is a block diagram of the self-payment system depicted in FIG. 1, wherein the diagram also depicts example processes that can be performed by the self-payment system in accordance with an example embodiment.
Figure 6A:
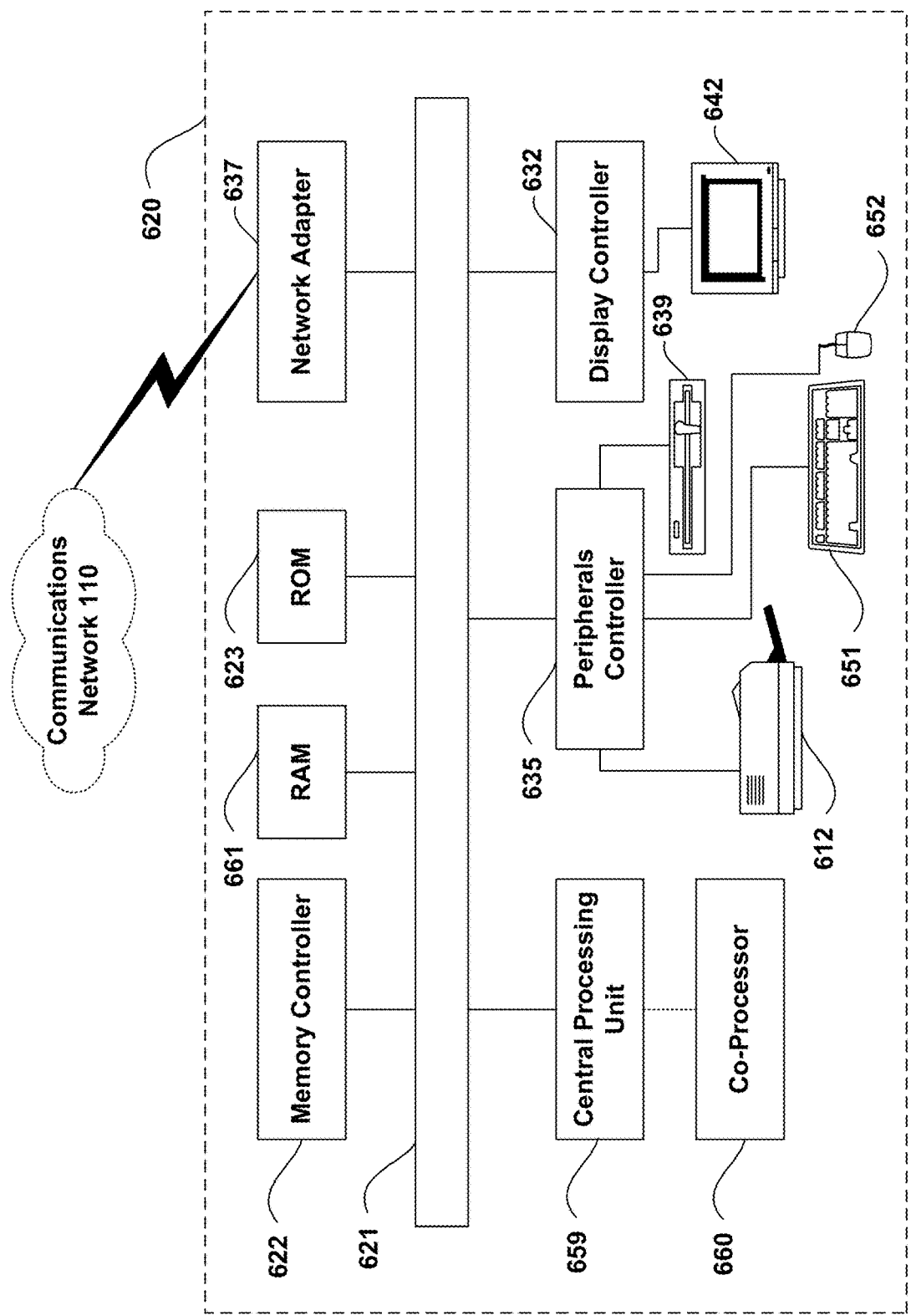
FIG. 6A is a block diagram of one embodiment of a computer system in which aspects of the disclosed systems and methods may be embodied.
Figure 6B:
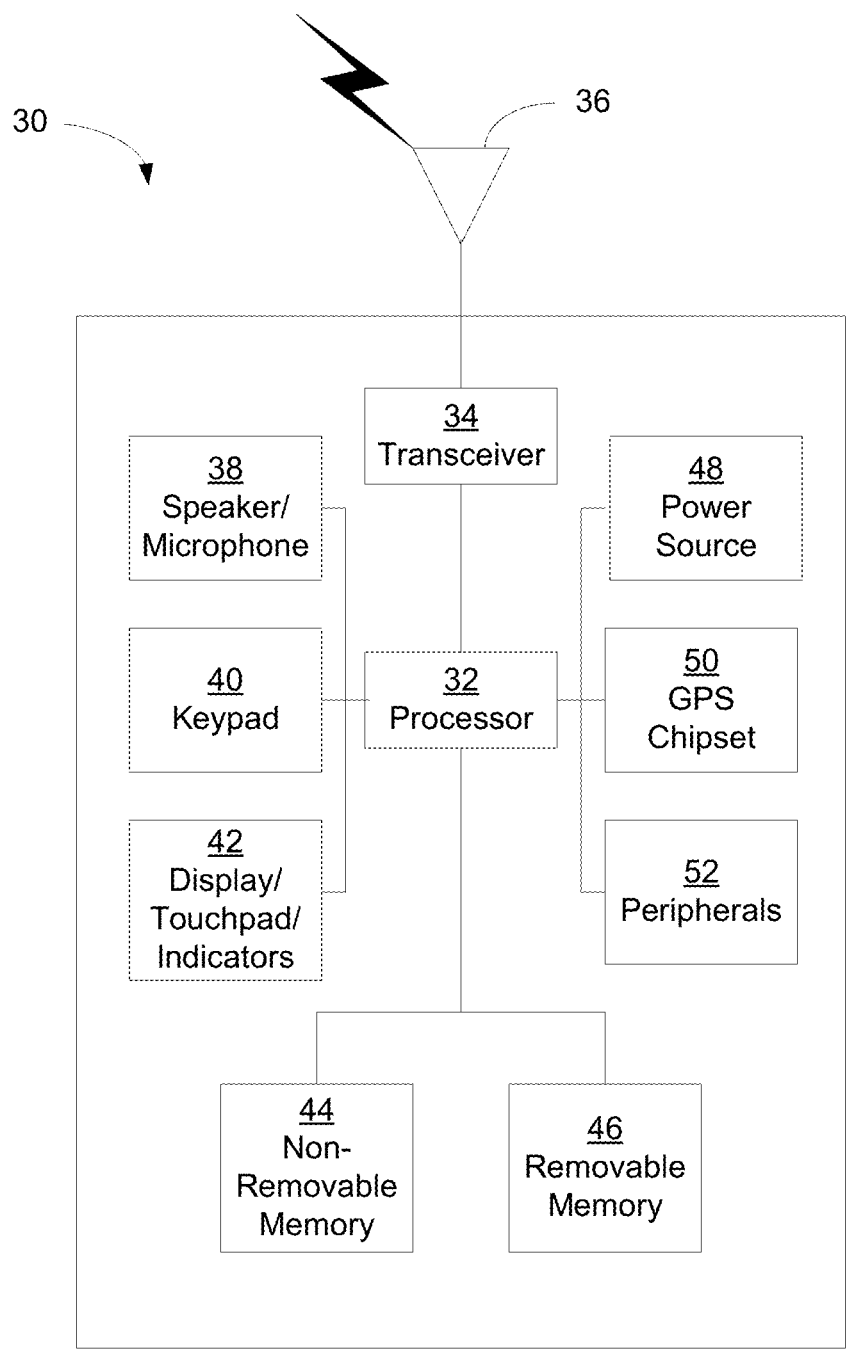
FIG. 6B is a block diagram of an example computing device for use in accordance with the present disclosure.

FIG. 6B is a block diagram of an example hardware/software architecture of a node of a network, such as one of the clients, servers, engines, or devices illustrated in FIGS. 1-5. As shown in FIG. 6B, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. Any suitable node 30 may be configured to host the various operations management applications, such as a self-ordering application or order-fulfillment application for example. It will be understood that the node 30 can include the computing device 112, which can be configured as various devices, examples of which include a desktop computing device, a server computing device, or a portable computing device, such as a laptop, tablet, or smart phone. As should be appreciated, any of the above components may be distributed across one or more separate devices and/or locations.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 6B depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 6B, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 1-5) and in the claims. While FIG. 6B depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including rules engines, computing devices, servers, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 6B as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of orders as described herein. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player.

In various embodiments, the display/touchpad/indicators 42 are capable of receiving and/or providing information pertaining to orders. The display/touchpad/indicators 42 may enable a user to communicate with the node 30. Thus, the node 30 can include a processor, a display coupled to the processor, and a memory in communication with the processor. The memory can have stored therein instructions that, upon execution by the processor, cause the computer system to effectuate operations, such as the operations described herein. The display 42 can be configured to display visual information, such as information described with reference to FIGS. 1-5, and such as the screen shots and variations thereof depicted in FIGS. 8A-34.

Figure 3:
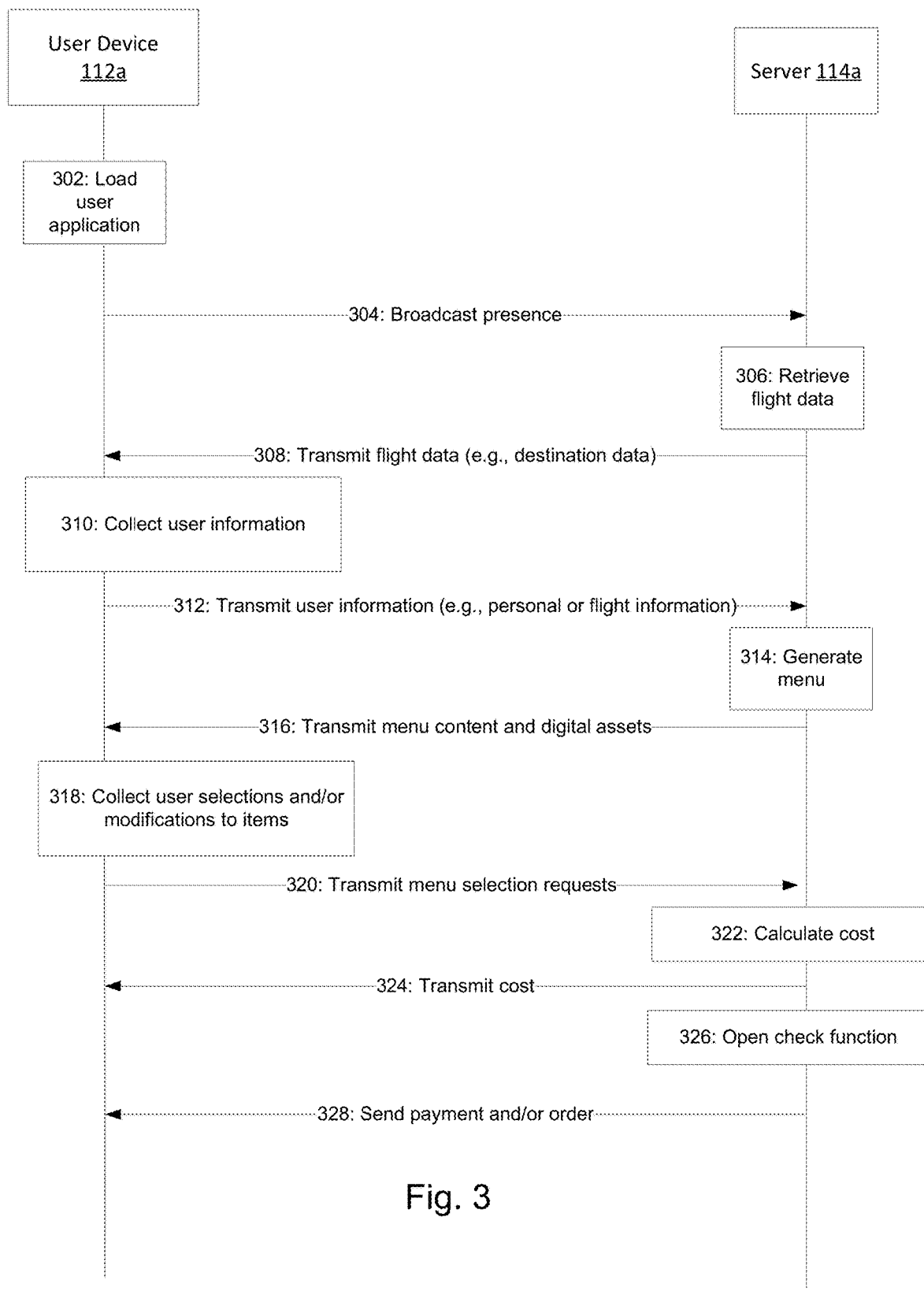
FIG. 3 is an example call flow for self-ordering using the self-order system depicted in FIG. 2.

Referring now to FIG. 3, an example method is depicted that can be performed within the ordering system 102 that is implemented in an airport setting. In particular, a user computing device 112a that is within an airport can communicate with a server 114a via the network 110. In accordance with the illustrated example, at 302, the ordering application, which can also be referred to generally as a customer or user application, is loaded on the user device 112a. For example, the user application can be loaded when a user of the user device 112a selects an icon that is displayed by the user device 112a. At 304, the user device 112a may broadcast a message to the server 114a that indicates that the user of the user device 112a has started the ordering application. At 306, the server can retrieve flight data, for instance flight data associated with a terminal in which the user device 112a is located. At 308, in accordance with the illustrated embodiment, the server 114a sends flight data to the user device 112a. For example, the server 114a can send updated arrival or departure times associated with the terminal in which the user device 112a is located. At 310, the user device 112a can collect information associated with the user. For example, the user application can receive flight information associated with the user. In some cases, the user application can determine characteristics associated with the user based on an identity of the user. At 312, the user device 112a can send information, for instance flight information or personal information, associated with the user to the server 114a. At 314, the server 114a generates a menu that includes items that can be purchased by the user. In some cases, for example when no personal information associated with the user is provided, a default menu may be generated. The default menu may be based on the time of day, available resources, or the like. In a restaurant context, there may be a default menu for each of a breakfast time, a lunch time, a dinner time, a late night time, or the like. Similarly, there may be a default menu for each of various staffing configurations. Thus, the server 114a may generate a first default menu when staff is limited, and a second default menu that is larger than the first default menu when staff is not limited.

Still referring to FIG. 3, at 314, the server 114a may generate a custom menu based on personal information that may be received at 312. By way of example, if the server 114a receives personal information that indicates that the user is under the legal drinking age, the server 114a may generate a custom menu that excludes alcoholic beverages. By way of further example, if the server 114a receives personal information that indicates that the user is traveling to a particular city or region, the server 114a may generate a custom menu that includes items associated with the particular city or region. For example, if the user is traveling to a beach resort town, the server 114a may generate a custom menu that includes items associated with the beach, such as sunglasses, sunscreen, towels, swimwear, or the like. Further, at 314, the server 114a can generate recommendations using the recommendation engine 108a. By way of example, if the server 114a determines that it is raining at the destination associated with the user, the server 114a may recommend an umbrella to the user. Thus, an umbrella may be included in the menu. Thus, as further described below, the server 114a may generate various recommendations based on information from external parameters, such as weather for example. Other recommendations may be based on other parameters. For example, the server 114a may generate a recommendation for hand sanitizer before and/or after a customer has ordered a meal.

At 316, in accordance with the illustrated example, the menu content and digital assets are send to the user device 112a. Digital assets may refer to images, video, or sound. For example, menu content may include digital assets associated with the menu, such as pictures of food for example, and written text associated with the menu, such as written description of the food items for example. At 318, the user device 112a receives selections from the user. The selections may correspond to menu items that the user wants to purchase. At 320, the user device 112a sends the user selections to the server 114a. At 322, based on the user selections, the server 114a can calculate the cost of the selections. At 324, the server 114a can send the user device 112a a message that includes the final cost that is due to be paid by the user. At 326, the server 114a can check an open check function. If the open check function is set to true, an order can be processed without payment. In such a scenario, the check may be picked up and closed from another server, or from the user's computing device 112. At 328, the user device can send a final order to the server 114a and/or the user device 112a can send payment information to the server 114a, as further described below.

Figure 8A:
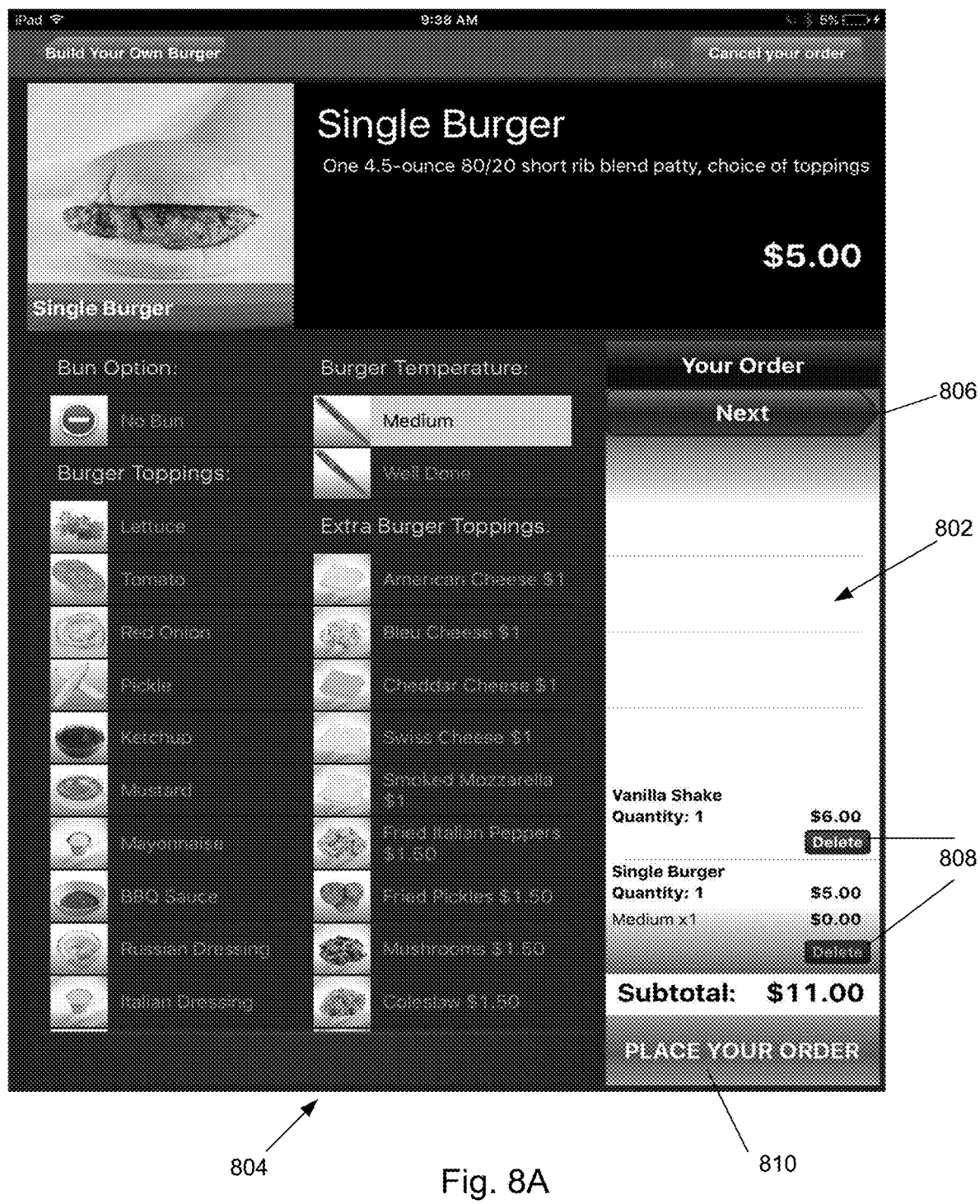
FIG. 8A is a screen shot of an example ordering page.

Referring to FIG. 8A, an example ordering page 800 can be used to enter orders, as described above. For example, a user (e.g., customer or staff member) can select items that are displayed on the ordering page 800. When a user selects an item for purchase, the selected item may be displayed in an order window 802 of the ordering page 800. Options or modifiers associated with the selected item may be displayed in an option window 804 of the ordering page 800. When a user is finished selecting an item, the user may select a next option 806 to return to a menu and add other items to the order. If a user wants to remove a selected item from an order or remove a selected modifier that is associated with a selected item, the user may select a delete option 808 that is associated with the undesired item or modifier. When the user is finished selecting items, the user may select a place order option 810 to send the order to the order-fulfillment system 104, which can be a kitchen in a restaurant context. After selection of the place order option, a payment page, for instance a payment page 900 shown in FIG. 9A, may be rendered. It will be understood that users may make selections by tapping a touchscreen or my clicking a mouse, by any other appropriate means as desired.

Figure 8B:
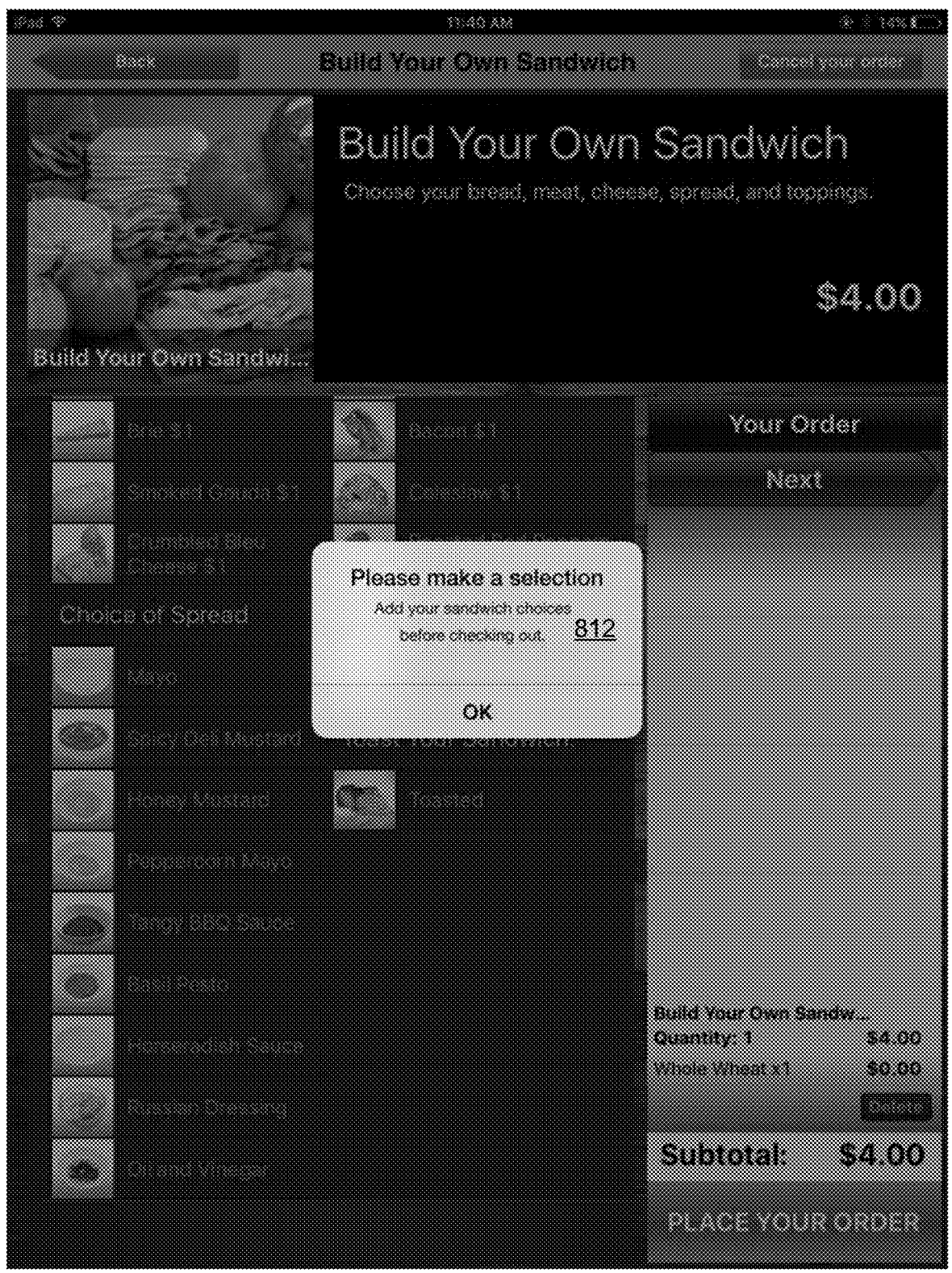
FIG. 8B is a screen shot that shows an example modifier reminder.
Figure 8C:
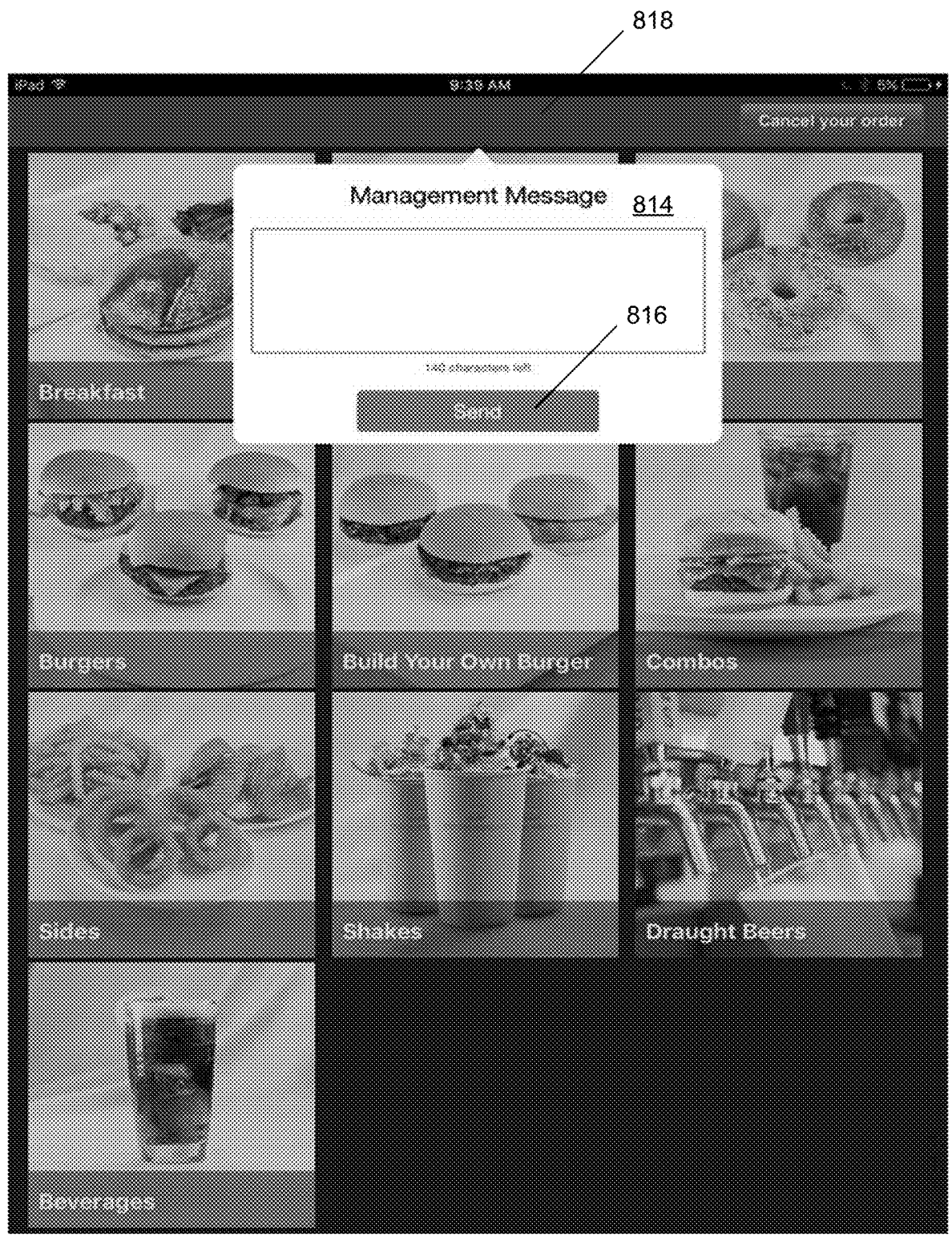
FIG. 8C is a screen shot that shows an example management message box.

Referring to FIG. 8B, if a selected menu item requires that modifiers are selected, a modifier reminder 812 may be displayed. By way of the illustrated example, if a user selects a sandwich, the modifier reminder 812 is displayed until the user selects the contents of the sandwich. By way of another example, if a user selects one dozen bagels, the modifier reminder 812 is displayed until the user selects the type of bagels. In some cases, after the requirement is met or the selected menu item that requires a modifier is deleted, the modifier reminder 812 is no longer displayed. Referring to FIG. 8C, in accordance with an example embodiment, the user may send a message to staff, for instance management, via a management message box 814. The user may enter a message that is limited in characters, for instance 140 characters. It will be understood that the management message box 814 may be configured to have no character limitation or any appropriate character limitation as desired. By way of example, a user, such as a customer or staff member, may enter instructions in the management message box 814. Such instructions may include preferences related to the order or the customer. The user may select a send option 816 to send the instructions to the order fulfillment system 104. In an example, the management message box 814 may be rendered when the user selects, for example by tapping, a header 818.

Figure 9A:
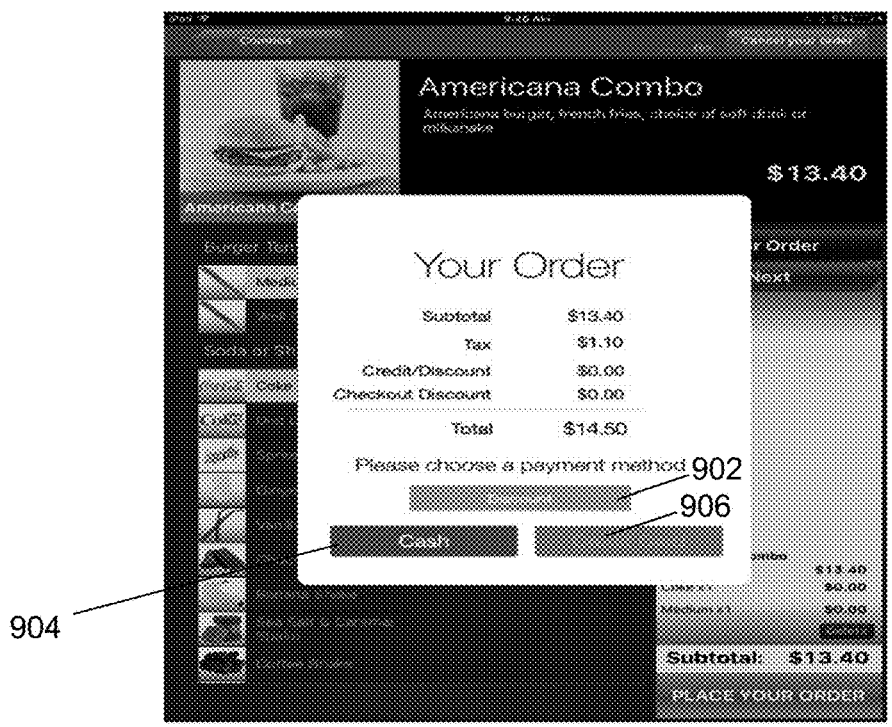
FIG. 9A is a screen shot of an example payment page.
Figure 9B:
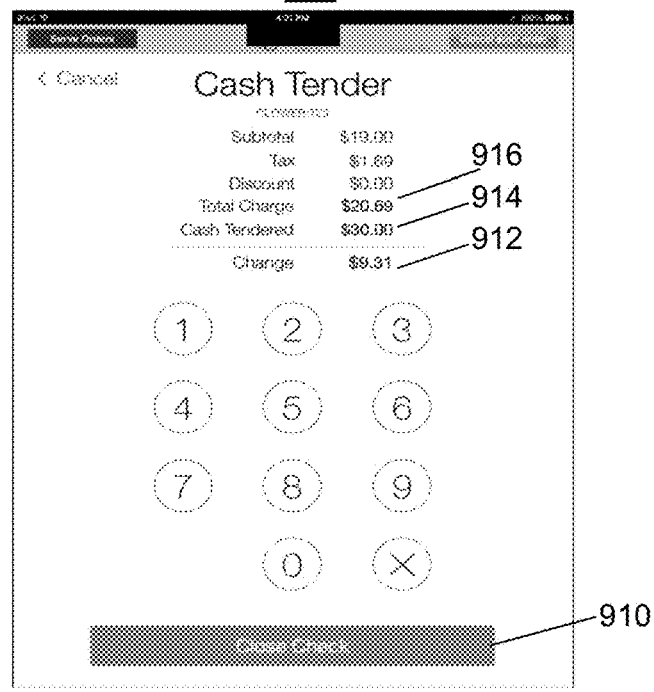
FIGS. 9B-D are screen shots of example cash pages.
Figure 9D:
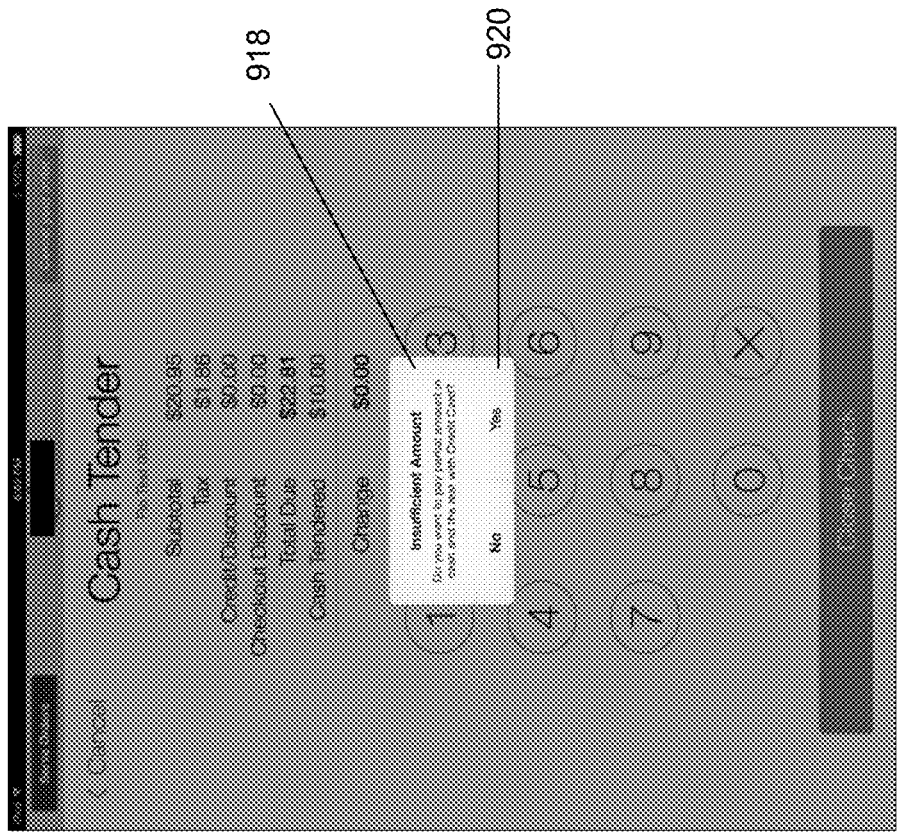

Referring now to FIG. 9A, after an order is placed via the place order option 810, a payment page 900 may be displayed. The payment page 900 may offer payment choices for the user. In accordance with the illustrated example, the payment choices include a discount option 902, a cash option 904, and a credit card option 906. It will be understood that any appropriate payment option may be included as part of the payment page 900 as desired. Referring to FIG. 9B, when the user selects the cash option 904, a cash page 908 may be displayed. The cash page 908 may display digits so that the user, for instance a staff member, can manually enter the amount of cash that is received from a customer. When the cash is entered, the user may select a close check option 910, which may cause a cash register to open and a change amount 912 to be rendered on the screen. When the cash register opens, a staff member can make the change that is displayed on the change amount 912, thereby completing the transaction.

Figure 9C:
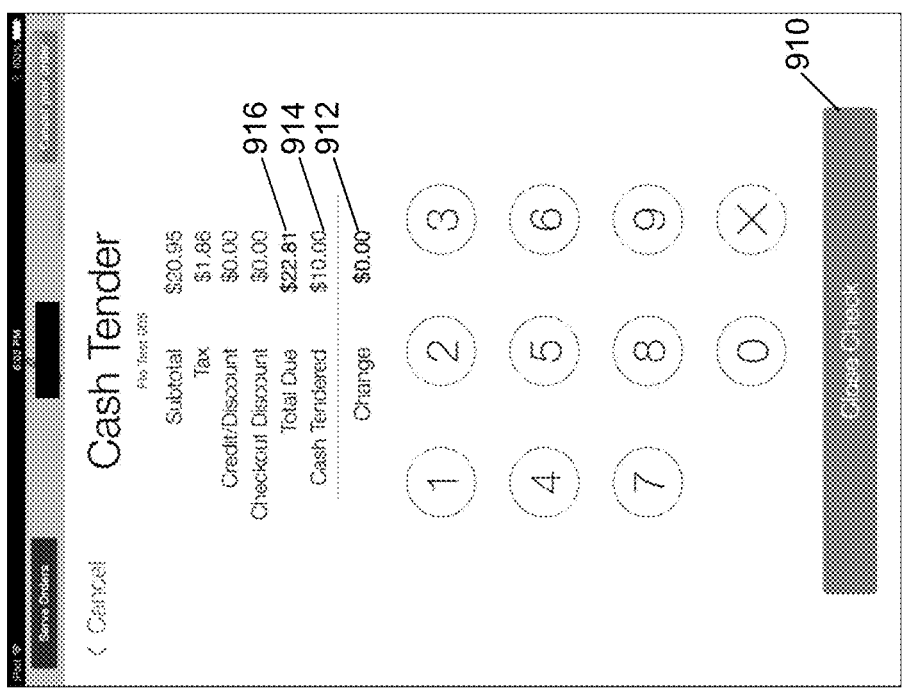

Referring to FIG. 9C, in some cases, as shown in the example, an amount of cash tendered 914 by the customer does not meet or exceed the total due 916. In such a case, an insufficient amount box 918 may be displayed, such as the box 918 shown in FIG. 9D. The box 918 may ask whether the customer wants to pay the remaining amount that is due with a credit card. If the user selects a yes option 920, a credit page 924 may be displayed (see FIG. 9E). Further, the register door may open for cash to be deposited, and the staff member may swipe the customer's credit card to account for the remaining balance. The credit page 924 may also be displayed when the credit option 906 is selected. Referring to FIG. 9E, a tip may be entered via a tip box 926. In an example, the tip may be applied to the credit card. When the tip is received, the user may select an enter option 928, and in response, a receipt may be generated.

Figure 9F:
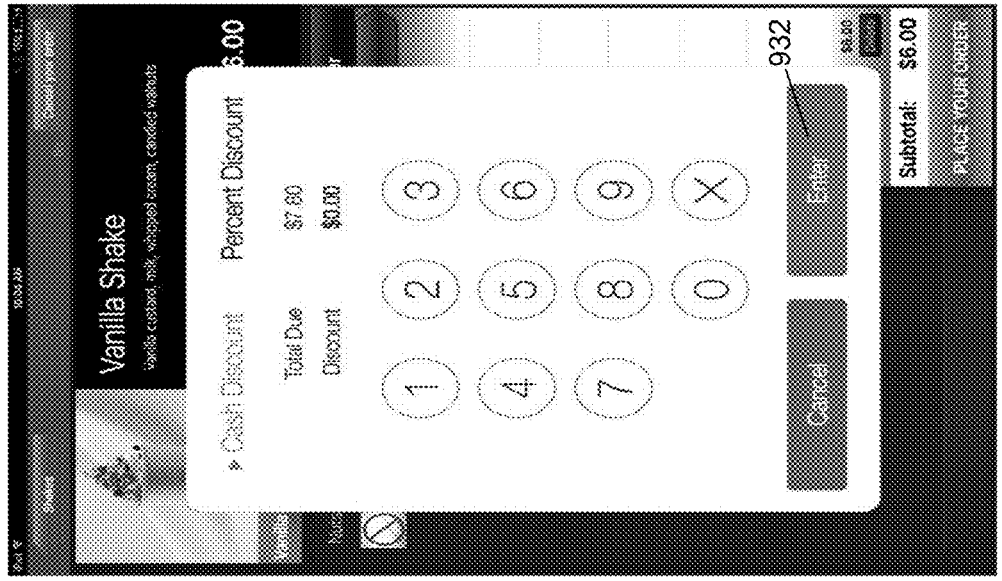
FIG. 9F is a screen shot of an example discount page.
Figure 9E:
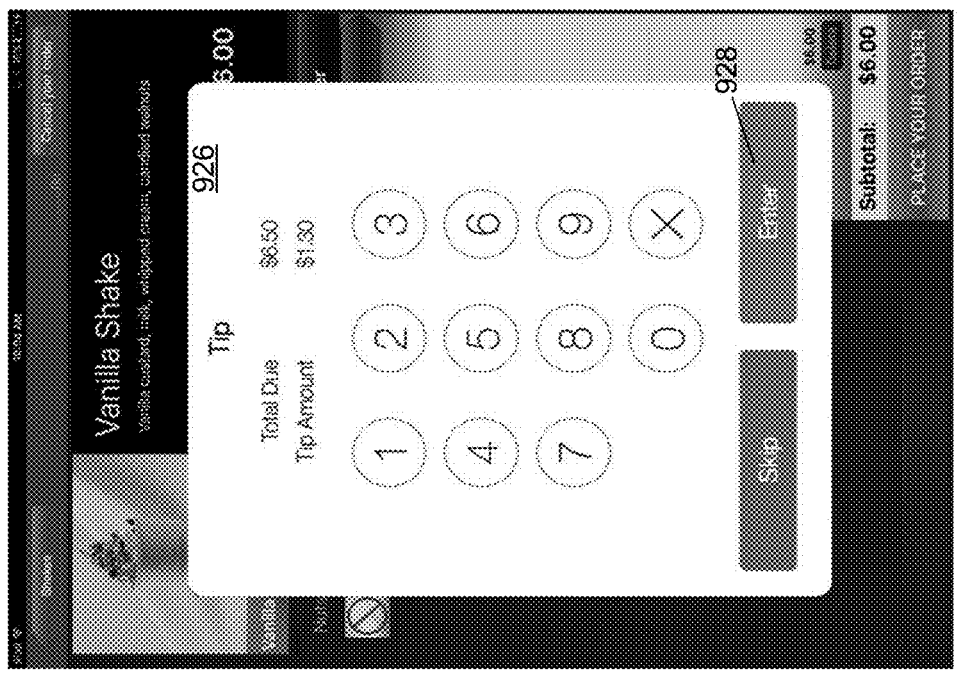
FIG. 9E is a screen shot that shows an example tip box.

Referring to FIG. 9F, when the user selects the discount option 902, a discount page 930 may be displayed. The discount option 902 may be selected by a staff member to apply a discount to a customer's order. As shown, in accordance with the illustrated example, the user may apply a cash discount or a percent discount. When an enter option 932 is selected, the discount is applied to the bill, and a new total is generated.

Referring now to FIG. 4, after an order is placed using the order system 102, the order can be fulfilled using the order fulfillment system 104. In accordance with the illustrated embodiment, the order fulfillment system 104 can include one or more preparation stations 118, an approval station 120, and a delivery station 122, which communicate with each other via a messaging server 114a. In an example embodiment, the communications are performed in an extensible messaging and presence protocol (XMPP) "chat room" environment. The system 104 can further include computing devices 112 of one or more users, for instance a customer 116a and a manager 116b, that also communicate via the messaging server 114a. The preparation stations 118, the approval station 120, and the delivery station 122 may include any number of computing devices 112 as desired. FIG. 4 depicts one example of a suitable communication architecture for fulfilling orders, such as an order placed by the customer 116a who may be in a restaurant or in an airport for example, it being appreciated that numerous suitable alternative communication architectures are envisioned. It will further be appreciated that the example system 104 is simplified to facilitate description of the disclosed subject matter and is not intended to limit the scope of this disclosure. Other devices, systems, and configurations may be used to implement the embodiments disclosed herein in addition to, or instead of, the system 104, and all such embodiments are contemplated as within the scope of the present disclosure.

Still referring to FIG. 4, in accordance with an example embodiment, after the customer 116*a* places an order via the computing device 112, the order can be sent to the server 114*a*. It will be understood that any number of computing devices 112 may be in the system 104 as desired, and each of the computing devices can be uniquely identifiable. In one embodiment, messages, such as orders for example, are broadcast in an JavaScript Objection Notation (JSON) format. Clients, such as customer devices and/or delivery station devices for example, can periodically broadcast their physical locations. As the order proceeds through the fulfillment process, the customer 116*a* and the manager 116*b* can be informed of the status of the order via messages sent to their devices 112. For instance, the server 114*a* can send an alert to the computing devices 112 when the status of the order changes. In an example aspect, when an order is received by the server 114*a*, the server 114*a* can identify predetermined time limits that are associated with portions of the order or the entire order. Predetermined time limits can be configured via a settings page 1000, which is described below with reference to FIG. 10. The predetermined time limits can be customized at the client devices such that the predetermined time limits are sent to the server 114*a* when an order is placed. For example, a plurality of devices 112 can be grouped via a synced dynamic data model. Thus, the grouped devices 112 may be interchangeable with each other. If the order falls behind the predetermined time limits, staff at the preparations stations 118 and/or the delivery station 122 can be notified that the order is nearly late or running late. Thus, the staff can be informed of the situation and can take appropriate action.

In accordance with an example embodiment, when an order is received by the server 114*a*, the server 114*a* can identify one of the preparation stations 118 that should prepare the order. For example, if the order is for an alcoholic beverage, the identified preparation station 118 might be a bar. By way of further example, if the order is for a hamburger, the server 114*a* can send the order to a computing device 112 located at a grill. Furthermore, when the order is received by the server 114, the order can be put in an "initial" state. Orders, and in particular items that are ordered, which are in the initial state can be displayed on the preparation stations 118. In an example embodiment, the computing devices 112 at the preparation stations 118 filter the orders such that only items that can be prepared by a particular preparation station are displayed by the particular preparation station. Items that do not require preparation, such as retail items for example, may skip the initial state and go straight to the preparation approved state, described below.

After an item has been prepared at a preparation station 118, a message can be sent from a computing device 112 at the preparation station 118 to the server 114*a* that indicates that the status of the item is "prepared." In some cases, the preparation station 118 can send items to the approval station 120 for approval. Other items do not require approval, and thus are not sent to the approval station 120. When items are approved at the approval station, a message can be sent from a computing device 112 at the approval station to the server 114*a*. The message may indicate that the status of the item is "preparation approved." When the items reach this state the server 114*a* can send an indication to the delivery station, and in particular mobile devices 112 of the delivery station, that the items are ready for pickup. In an example restaurant configuration, the mobile devices 112 at the delivery station 122 can be used by wait staff. In an example embodiment, the computing devices 112 at the delivery station 122 filter the orders such that only items that can be delivered by a particular delivery station are displayed by devices associated with the particular delivery station. Thus, the mobile devices 122 can have filters that allow them to only show orders for areas to which the user of the mobile device 122 delivers. One of the users of the devices 112 that are part of the delivery station 122 can actuate an option on the device 112 so as to accept responsibility for delivering the item. In response to the actuation, a message can be sent to the server 114*a*. The message can indicate that the status of the item is "delivering." In an example embodiment, location instruments can be used to monitor the location of the deliverer. Thus, the device 112 of the customer 116*a* can receive various information associated with the delivery, such as who will be delivering the items and an expected delivery time for example.

Still referring to FIG. 4, after the items are delivered, the mobile device 112 associated with the delivery sends a message to the server 114*a* that indicates that the delivery is complete. Thus, the server 114*a* can set the status of the items to "completed." The delivery information, such as times associated with each of the above-described statuses for example, can be saved at the server 114*a* for any period of time as desired. For example, after a time limit for archiving information expires, the order information can be offloaded, for instance to the cloud, to free up resources on the server 114*a* and/or the devices 112 in the order fulfillment system 104. In accordance with an example embodiment, while a given item is in any of the above-described states of order fulfillment, the item can be recalled or sent back to a previous state to address issues. A notification can be sent from one of the devices 112, and the server 114*a* can disseminate an alert to appropriate stations. For example, an order that has been recalled can be displayed with a visual alert that indicates to staff that the order has been recalled or has experienced an issue. Further, at any point, the customer 116*a* can send a request for service to the server 114*a*. The server 114*a* can disseminate the request to appropriate devices 112 so that the customer 116*a* can be assisted. In an example embodiment, the rules engine 108 determines which device 112 is closest to the customer 116 using a proximity instrument. The rules engine 108 can notify the server 114*a* that a given device 112 is closest to the customer 116. Thus, the server 114*a* can send the request for service to the device 112 that is closest to the customer 116*a*, thereby ensuring prompt customer assistance.

Figure 10:
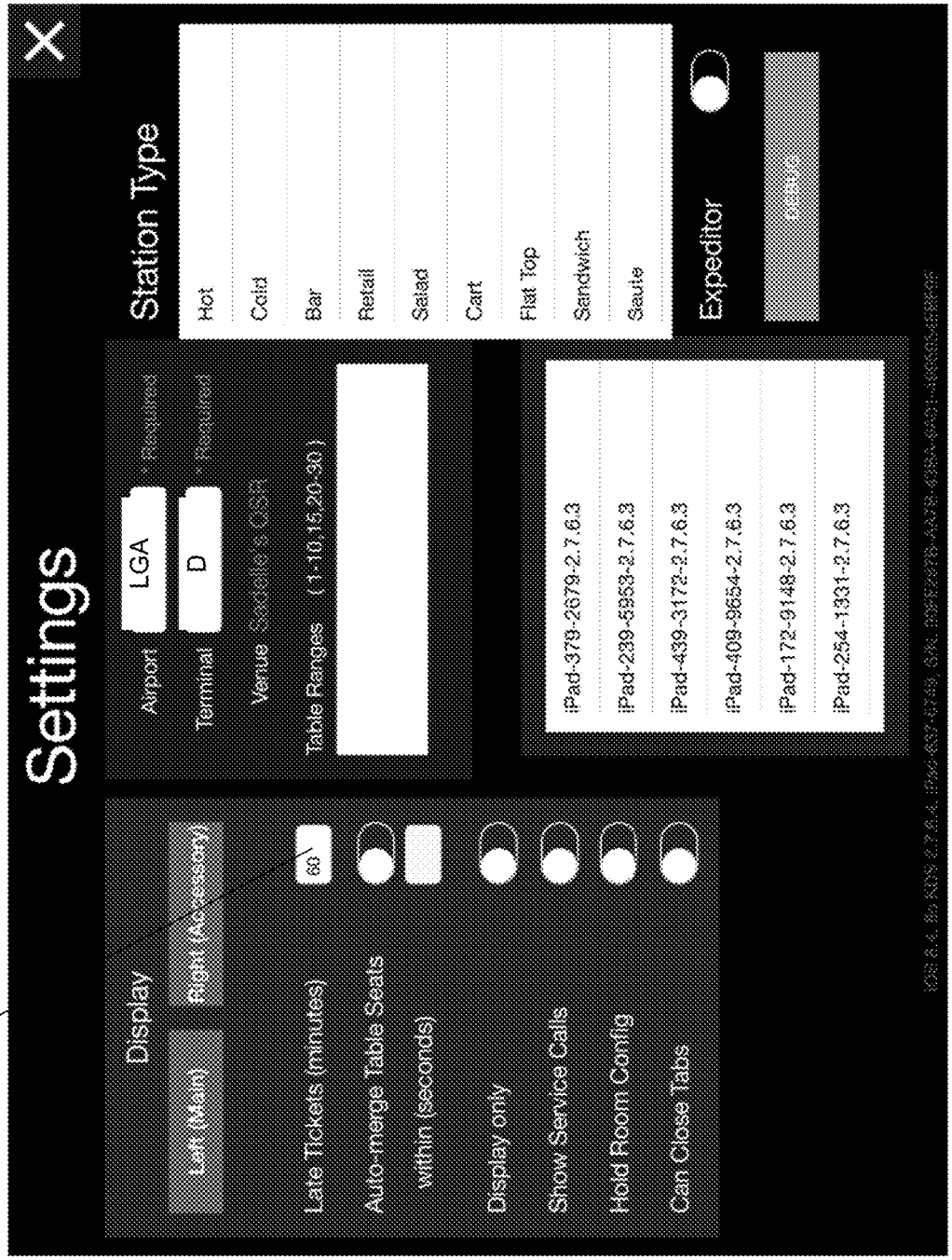
FIG. 10 is a screen shot of an example settings page.
Figure 11:
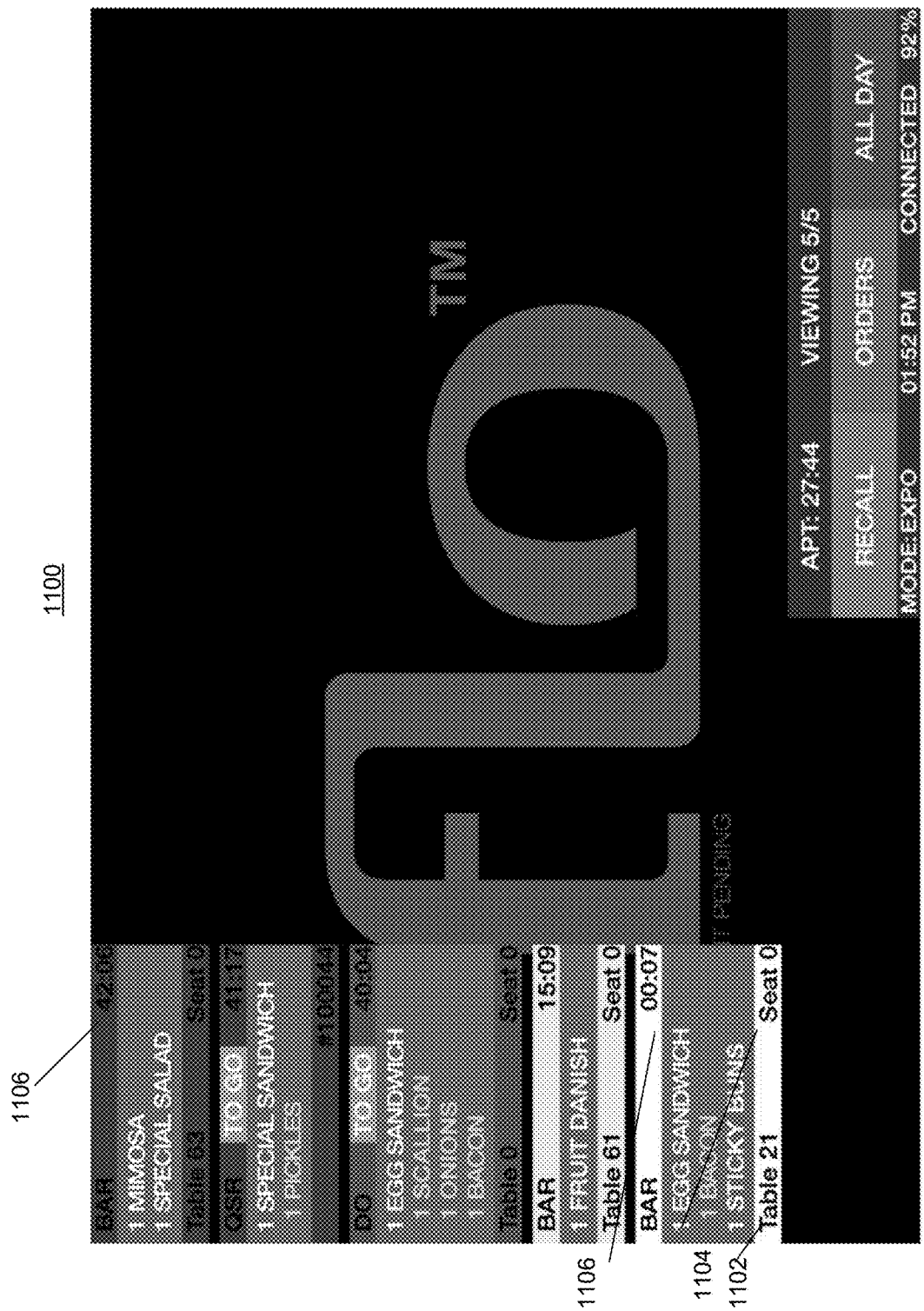
FIG. 11 is a screen shot of an example status screen page.

Referring now to FIG. 10, as mentioned above, the example settings page 1000 can be used to configure an order fulfillment system 104, for example a kitchen in the restaurant context. It will understood, as shown, that the settings page 1000 can be used to configure any station type as desired. In one example, the user, for instance a manager, can enter a time 1002 that corresponds to the predetermined time discussed above. By way of example, if a user inputs 60 minutes into the time 1002, 60 minutes is the predetermined time limit for determining whether an order is late. Thus, continuing with the example, if 60 minutes elapses and the order has not been delivered to the customer, staff at the preparations stations 118 and/or the delivery station 122 can be notified that the order is late. For example, referring to FIG. 11, when an order is late or overdue, an example status screen page 1100 may indicate that the order is late or overdue by rendering the late order in a different color than orders that are not late. It will be understood that any indicator (visual, audible, etc.) as desired may be used to show that an order is late. Similarly, the status screen page 1100 may indicate recalled items (canceled orders) by rendering the recalled item in a different color than other items, or via any other appropriate indication as desired. Furthermore, orders that are nearly overdue may be indicated by the status screen page 1100 so that those orders can be expedited. As shown, each order can be displayed in accordance with a table number 1102 and a seat number 1104. Further, as shown, each order can have a time 1106 associated with the order. The time 1106 may indicate the amount of time that has elapsed since the order was placed.

Referring again to FIG. 10, the example settings page 1000 can be used to configure other parameters of the order fulfillment system as desired. For example, a user can select an "Auto-merge Tables" option so that tables are automatically merged with one other if their respective orders are placed within a certain amount of time, which can also be set by the user. By way of example, if the time is set to ten seconds, then tables that have orders placed within ten seconds of each other will be combined with each other, such that the tables are treated as a single customer experience. This may be useful, for example, when one person is paying for the orders of more than one table. It will be understood that a user may enable or disable the "Auto-merge Tables" option as desired. As shown, the settings page 1000 may also include a "Hold Room Config" option. When selected, this option may display a global view of all items in all phases of the ordering lifecycle. The "Hold Room Config" option may be useful for management because managers can see items that have been ordered on a ticket, regardless of which phase a given item is in. In one example, different phases are presented in different colors, such that managers can efficiently determine which items have been delivered, which items are on schedule, and which items are ahead of schedule or behind schedule.

Figure 12:
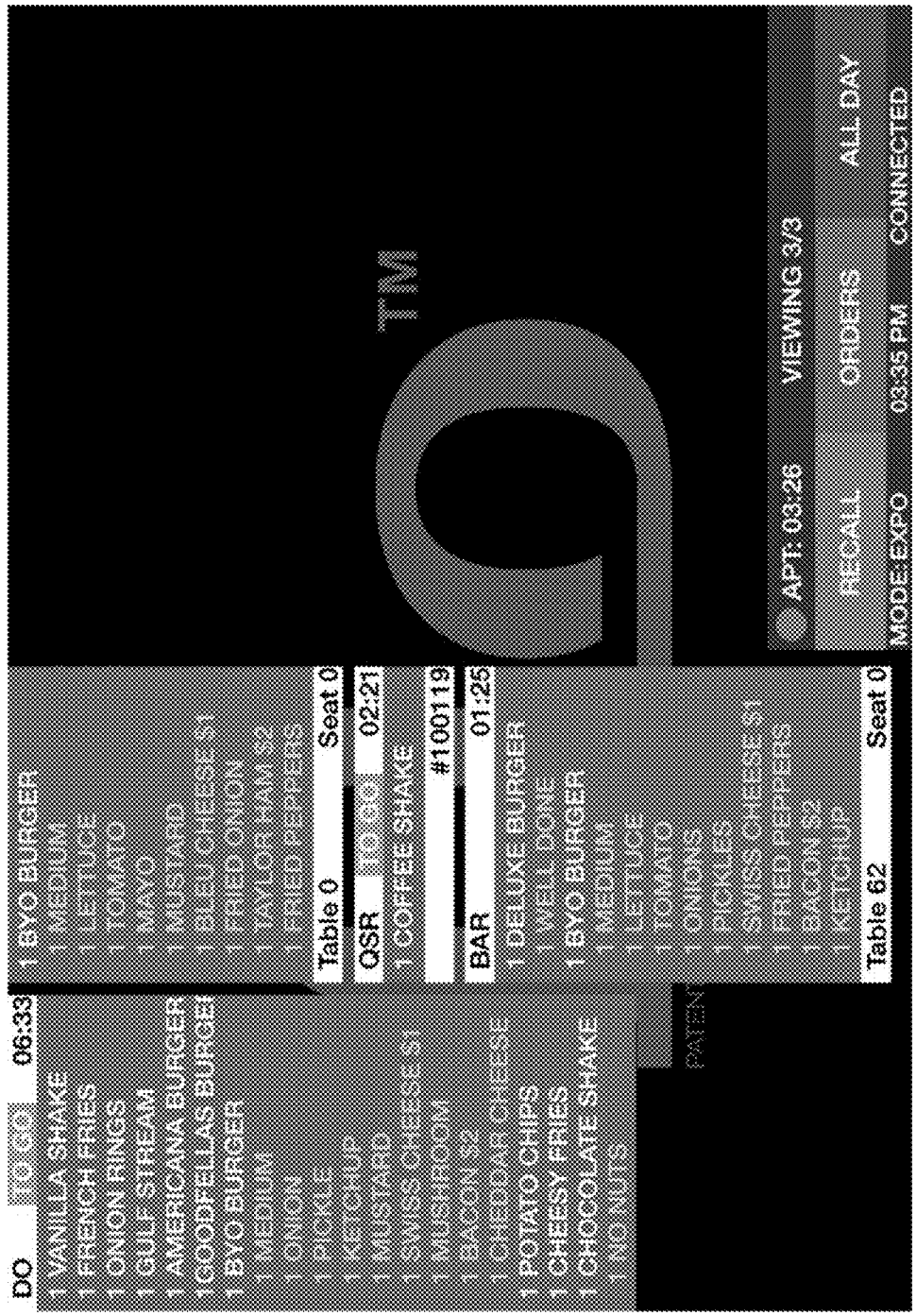
FIG. 12 is a screen shot of another example status screen page.
Figure 13:
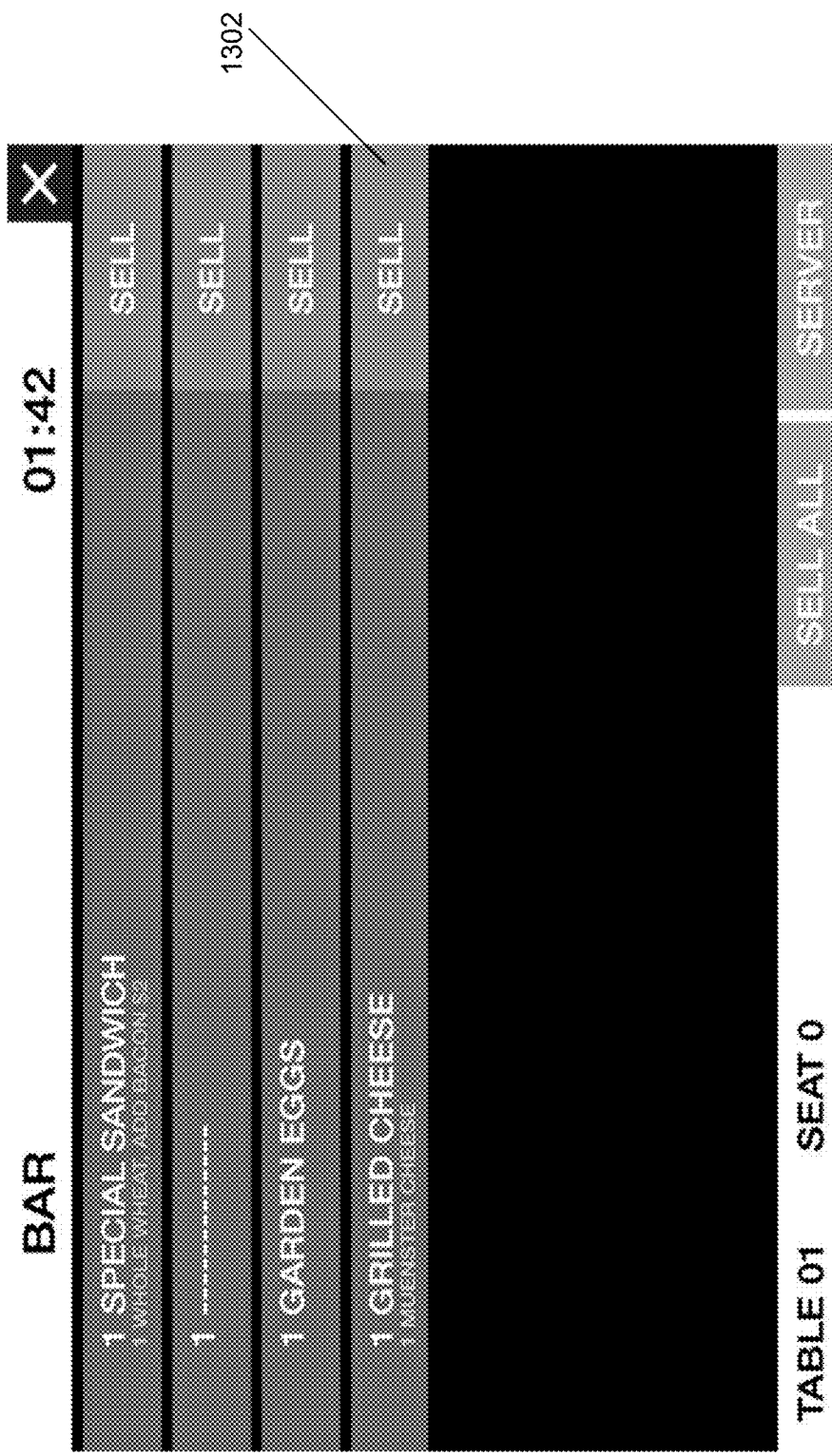
FIG. 13 is a screen shot of an example individual item page.
Figure 14:
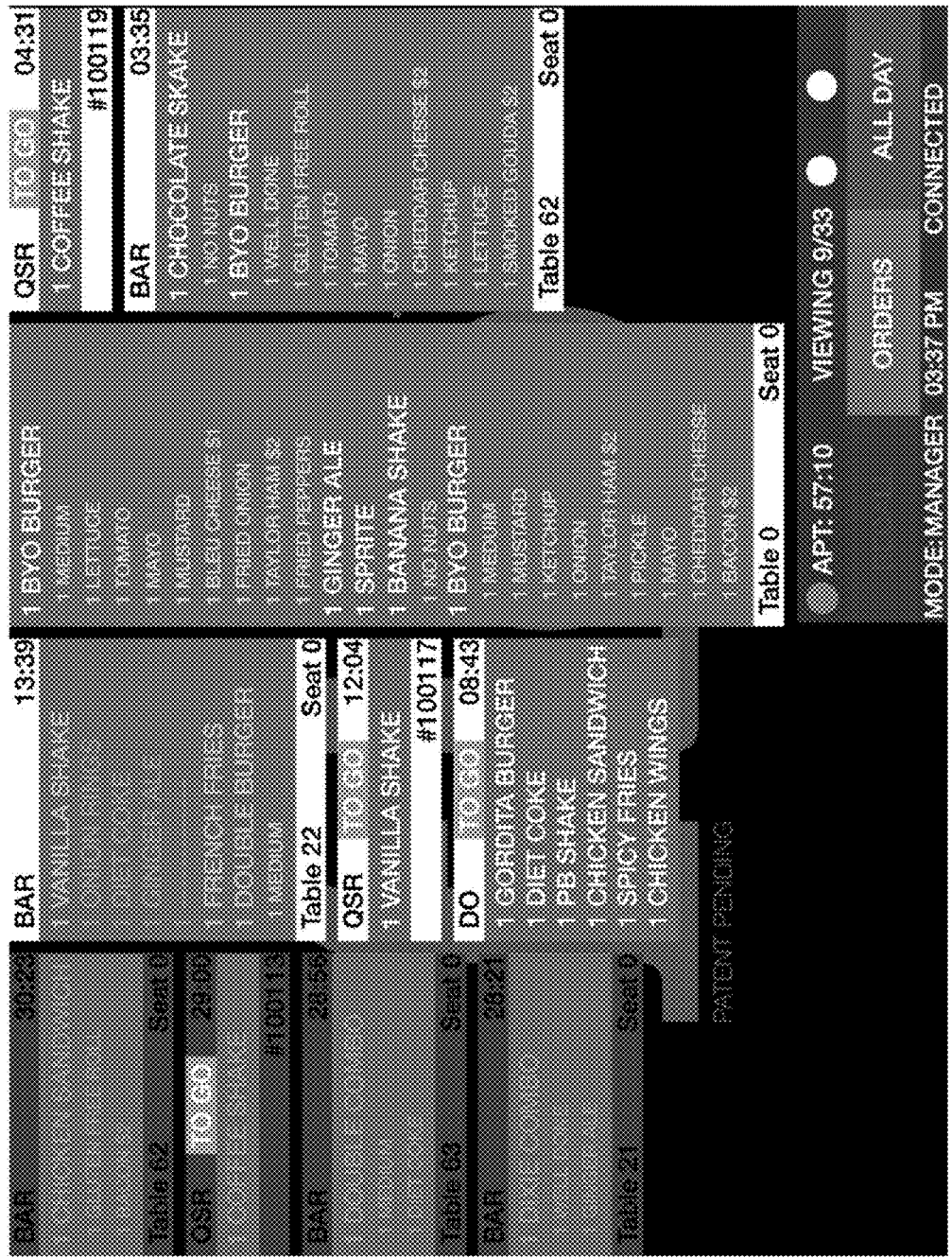
FIG. 14 is a screen shot of yet another example status screen page.

Referring now to FIG. 12, other example orders are displayed by another example status screen page 1200. By way of example in a restaurant context, when an order is ready to be delivered to a table, a user can double tap the order on the status screen 1200, which may indicate to the servers that order should be picked up and delivered. Alternatively, in accordance with an example embodiment, a user can single tap the order on the status screen 1200 to indicate that individual items within an order are ready for delivery. For example, an individual item page 1300 (FIG. 13) may be displayed when a user single taps an order. The individual item page 1300 may include each item in the selected order. By selecting a sell option 1302 that is associated with a given item that is ready, the servers are informed that the given item is ready for delivery, and the item may disappear from the status screen 1200. A user may select a sell all option 1304 to inform the severs that the entire order is ready for delivery, and the entire order may disappear from the status screen 1200 in accordance with an example embodiment. Referring also to FIG. 14, an example status screen page 1400 displays all orders having any status from submission to delivery. Thus, a user can view the status screen 1400 to determine which orders are open (not prepared or delivered), which orders were tapped "off" by the kitchen, and which orders were tapped "off" by a device of one of the wait staff (servers). The orders can be displayed in different colors by the status screen 1400 to indicate different statuses associated therewith.

Figure 15:
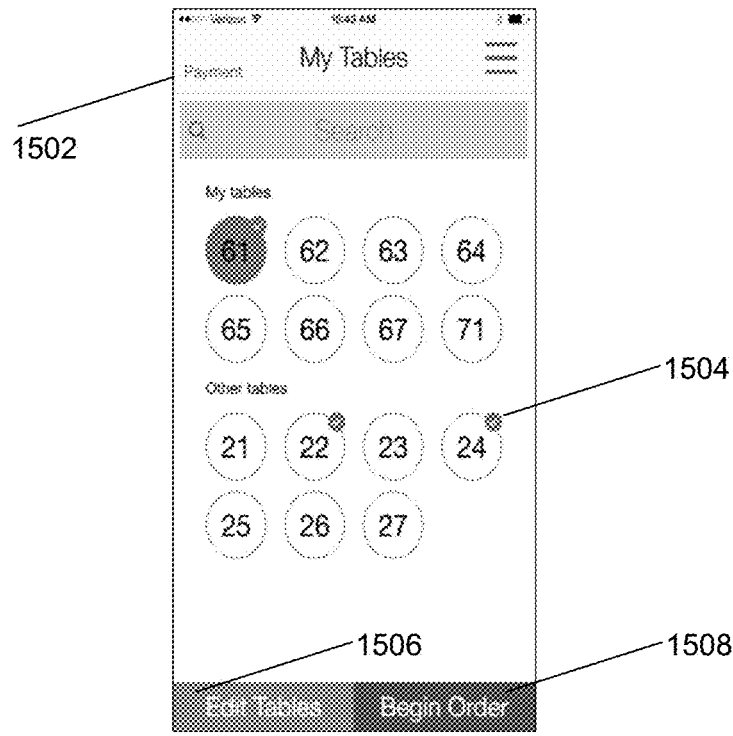
FIG. 15 is a screen shot of an example table page.

As described above, one or more preparation stations 118, an approval station 120, and a delivery station 122 can communicate with each other via the messaging server 114a. With respect to an example restaurant implementation, a manager can use the approval station 120 to communicate with wait staff using devices 112. In some cases, wait staff use devices 112 to manage their tables. Referring to FIG. 15A, an example table page 1500 is shown. The table page 1500 displays various tables. As shown, the tables can be numbered or otherwise identified. In accordance with the illustrated example, a user (e.g., waiter) can select table 61 on the table page 1500, and select a payment option 1502 to close the check for table 61. An indication, such as a check mark 1504, may be displayed with a given table to indicate that the given table is associated with an open order and a check associated with the given table has not been paid. In accordance with the illustrated example depicted in FIG. 15, tables 22, 24, and 61 have open orders associated therewith. In some cases, a user can select an edit tables option 1506 to add or remove tables from their assigned sections. A user can select a begin order option 1508 to add item's to a table's check, regardless of whether a table already has an order associated therewith.

Figure 16:
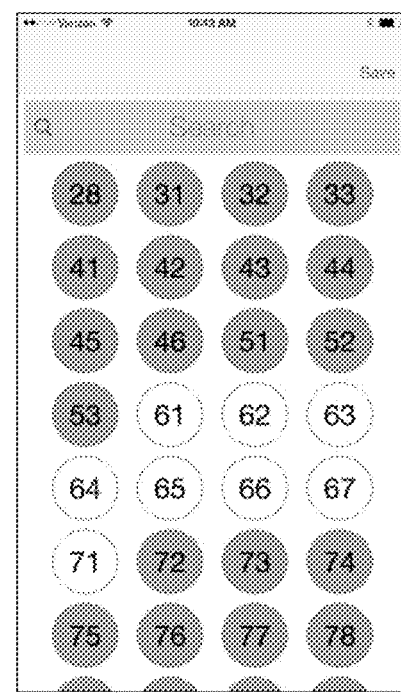
FIG. 16 is a screen shot of another example table page.

FIG. 16 depicts another example table page 1600 that is specific to a first user. In accordance with the illustrated example, tables 21-27 are assigned to a different user than the first user, and thus tables 21-27 do not appear on the table page 1600 that is associated with the first user. Tables that are assigned to the first user may be displayed and indicated by a first color on the table page 1600, and tables that are have not been assigned to any person or device 112 may be displayed and indicated by a second color on the table page 1600. In accordance with the illustrated example, tables 61-67 and 71 are assigned to the first user, and the rest of the illustrated tables are unassigned. It will be understood that assigned and unassigned tables may be indicated by any appropriate visual indicator as desired.

In accordance with an example embodiment, a user (e.g., a staff member) can enter orders for a customer using the ordering system 102. For example, referring to FIG. 17, a staff member can view an example menu page 1700 on a computing device 112 to enter an order that is specific to a table (e.g., table 114). In some cases, the menu page 1700 is rendered on the device 112 after the begin order option 1508 is selected. Various menu items 1702 can be displayed on the menu page 1700. If a particular menu item that is selected has the ability to be modified or has choices associated therewith, a modifier page 1800 (see FIG. 18) may be displayed after the menu item is selected. The modifier page 1800 may prompt the user to make choices associated with the selected menu item. The modifier page 1800 may include a quantity option 1802 to change the quantity of the menu item that is being ordered. After the modifiers associated with the menu item are selected, the user may select an enter option 1804 to add the item to the check. After selecting the enter option 1804, a suggestions box 1900 may be rendered. By way of example, the suggestions box 1900 may be used to indicate that a customer associated with the order requires special attention (e.g., VIP). The suggestions box may also be used to provide specific instructions to the preparation station 118 (e.g., kitchen). After any suggestions are entered, a next option 1902 may be selected so that a ticket page 2000 (see FIG. 20) is rendered.

Figure 20:
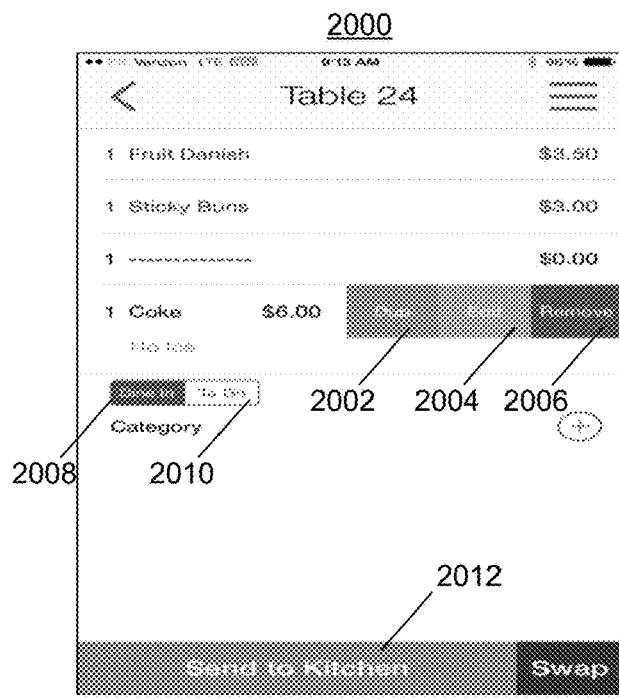
FIGS. 20 and 21 are screen shots of example ticket pages.
Figure 21:
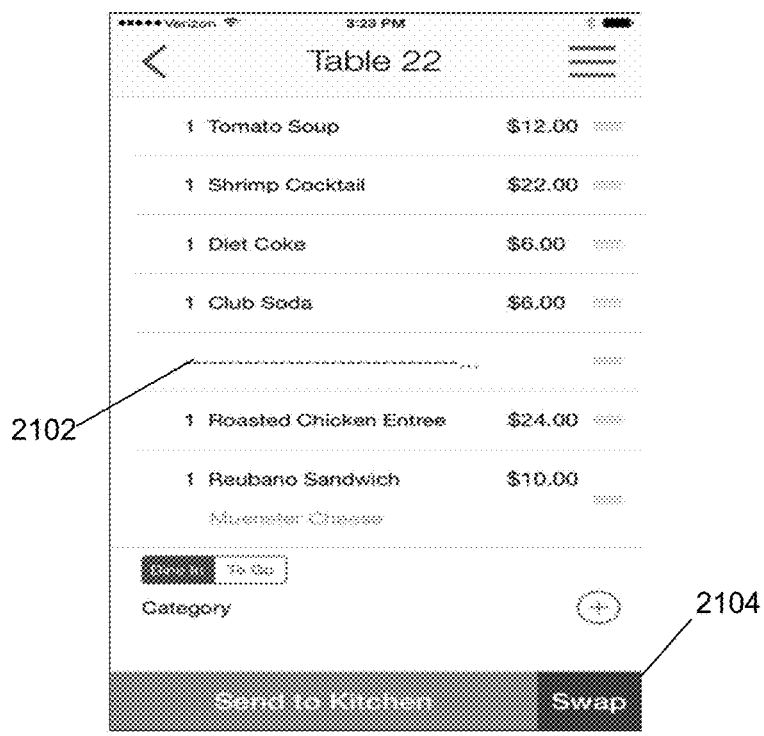

Referring to FIG. 20, the example ticket page 2000 is associated with an example order for table 24. The ticket page 2000 may indicate a status that is associated with each item. For example, the ticket page 2000 may display items in different colors depending on whether each item has been sent to the preparation station. For example, referring to FIG. 20, the item "Fruit Danish" may be displayed in red to indicate that it has been sent to the kitchen, and the item "Coke" may be displayed in black to indicate that it has not been sent to the kitchen. In an example embodiment, a user can make edits to an item that has not been sent to the kitchen, for instance by swiping on the item so that options (e.g., option 2002, 2004, and 2006) associated with the item are displayed. A user may select a duplicate option 2002 to duplicate an item exactly as it appears. That is, the duplicate option 2002 may change a quantity of an item from one to two. A user may select an edit option 2004 to change modifiers or a quantity associated with an item that has not been sent to the preparation station 118. A user may select a remove option 2006 to remove (cancel) an item from an order. In some cases, a user may select a dine-in option 2008 or a to-go option 2010 to notify the kitchen accordingly. When the order is ready, a user may select a send to kitchen option 2012 to transmit the order to the preparation station 118. In some cases, referring to FIG. 21, a course line 2102 can be dragged and dropped to divide courses as desired, and individual items can be dragged and dropped to change the displayed order of items. Thus, for example, the kitchen may view items in the order that the customer specifies, and thus may deliver items during the appropriate course. In an example, a swap option 2104 is selected to change the order of items or move the course line 2102.

Figure 22A:
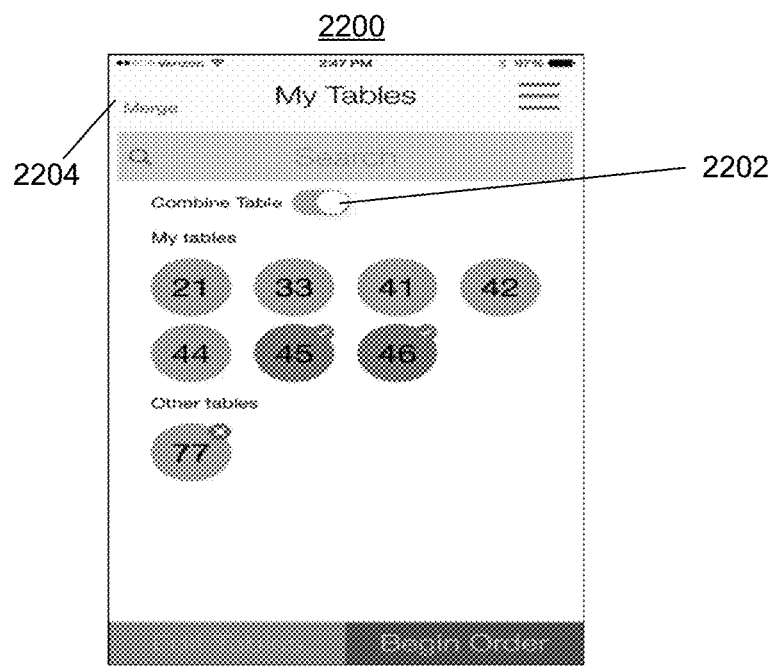
FIGS. 22A, 22B, and 23 are screen shots of other example table pages.
Figure 22B:
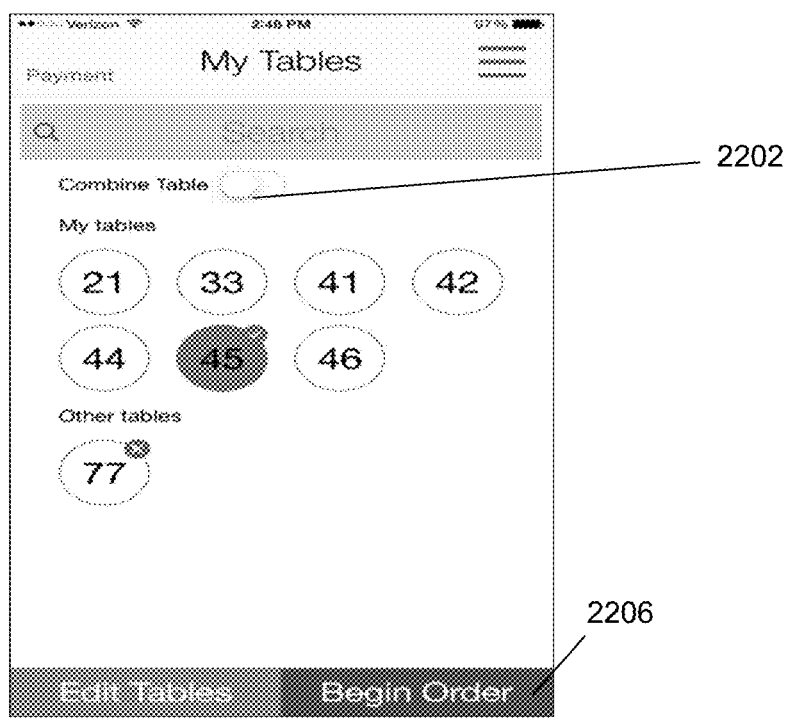

Referring to FIG. 22A, another example table page 2200 is shown to demonstrate an example of a how a user can combine tables. A user may select a combine table option 2202, and then select the tables that should be combined with each other. The table page 2200 may indicate certain tables that cannot be combined, for example, because orders have not been placed at those tables. In accordance with the illustrated example, tables 45 and 46 are selected for combining with each other, as indicated by the check marks associated therewith. After the tables are selected, a user may select a merge option 2204 to actualize the combination. In some cases, the first table that is selected for combining is the parent table, wherein the other selected tables' checks are combined to the parent table's check. Referring to FIG. 22B, in accordance with the illustrated example, table 45 was selected first, and thus the check of table 46 is combined into the check of table 45. As shown, after merging, the check mark may disappear from the merged table that is not the parent table (table 46). Items may be added to the merged check by selecting the parent table (table 45) and selecting a begin order option 2206, as described above.

Figure 23:
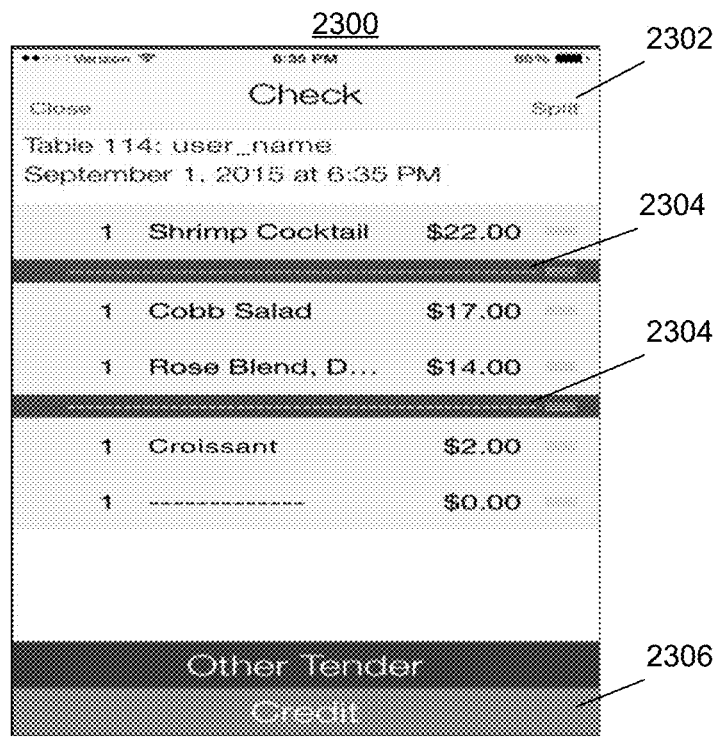
Figure 24:
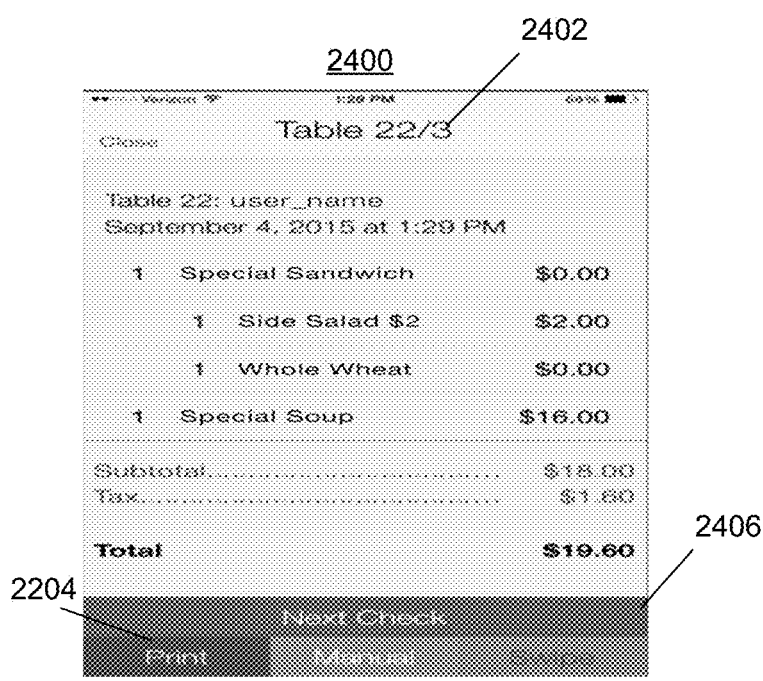
FIG. 24 is a screen shot of an example check page.

Referring to FIG. 23, an example split check page 2300 is shown. A user may select a split option 2302 to divide a check. In some cases, if the split option 2302 is selected once, the check will be split evenly as possible into two checks. One or more split lines 2304 may be displayed to divide a check in accordance with an example. The split lines 2304 may be dragged and dropped to revise how a check is divided. A user may select a credit option 2306 to view each individual check. An example check page 2400 is shown in FIG. 24. A check indicator 2402 indicates which check is being displayed. In accordance with the illustrated example, the check indicator 2402 is a '3', which indicates that the displayed check is the third check. A user can select a print option 2404 to print each individual receipt for a customer. A user can select a next check option 2406 to scroll though all checks associated with a given order.

In an example embodiment, the computing devices 112 can render a dashboard 2500 (see FIG. 25) so that users (e.g., managers) can view various levels of financial and operational information. By way of example, a manager may perform various actions such as refunding, menu updating, and overriding.

Figures 25, 26:
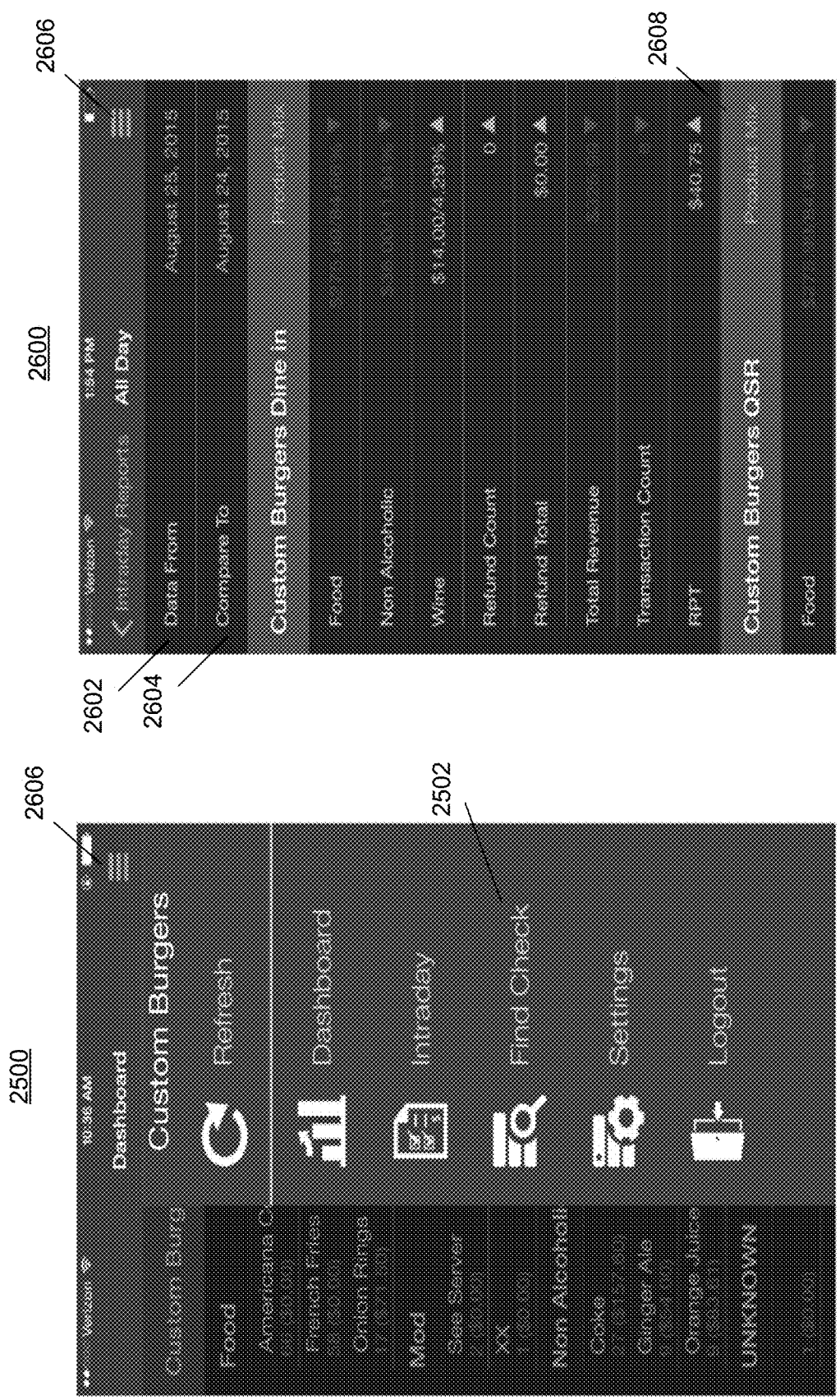
FIG. 25 is a screen shot of an example dashboard.
FIG. 26 is a screen shot of an example sales report page.

Referring to FIG. 25, an example dashboard 2500 is shown that may be associated with an operations fulfillment system 104. As shown, a user may select a find check option 2502 to search for a particular check. Using the dashboard 2500, a user may select a sales report page, such as a sales report page 2600 depicted in FIG. 26. A user may select a sales report from an entire day, from an hour, or from any specified time period as desired. The user may choose the day by selecting a data in a data from option 2602. As shown, in accordance with the example, the sales report page 2600 shows a sales report from Aug. 26, 2015. The user may select a date on a compare to option 2604, wherein sales on the date corresponding to the compared to option 2604 are compared to sales on the date corresponding to the data from option 2602. For example, as shown, differences may be displayed by aggregate number or by a percentage difference. A main menu option 2606 may be selected in order to send the report in an email format. A user may select a product mix option 2608 to show various attributes associated with a particular item such as, for example, price, quantity sold, and revenue earned from sales of the item within the specified time period.

Figures 27, 28:
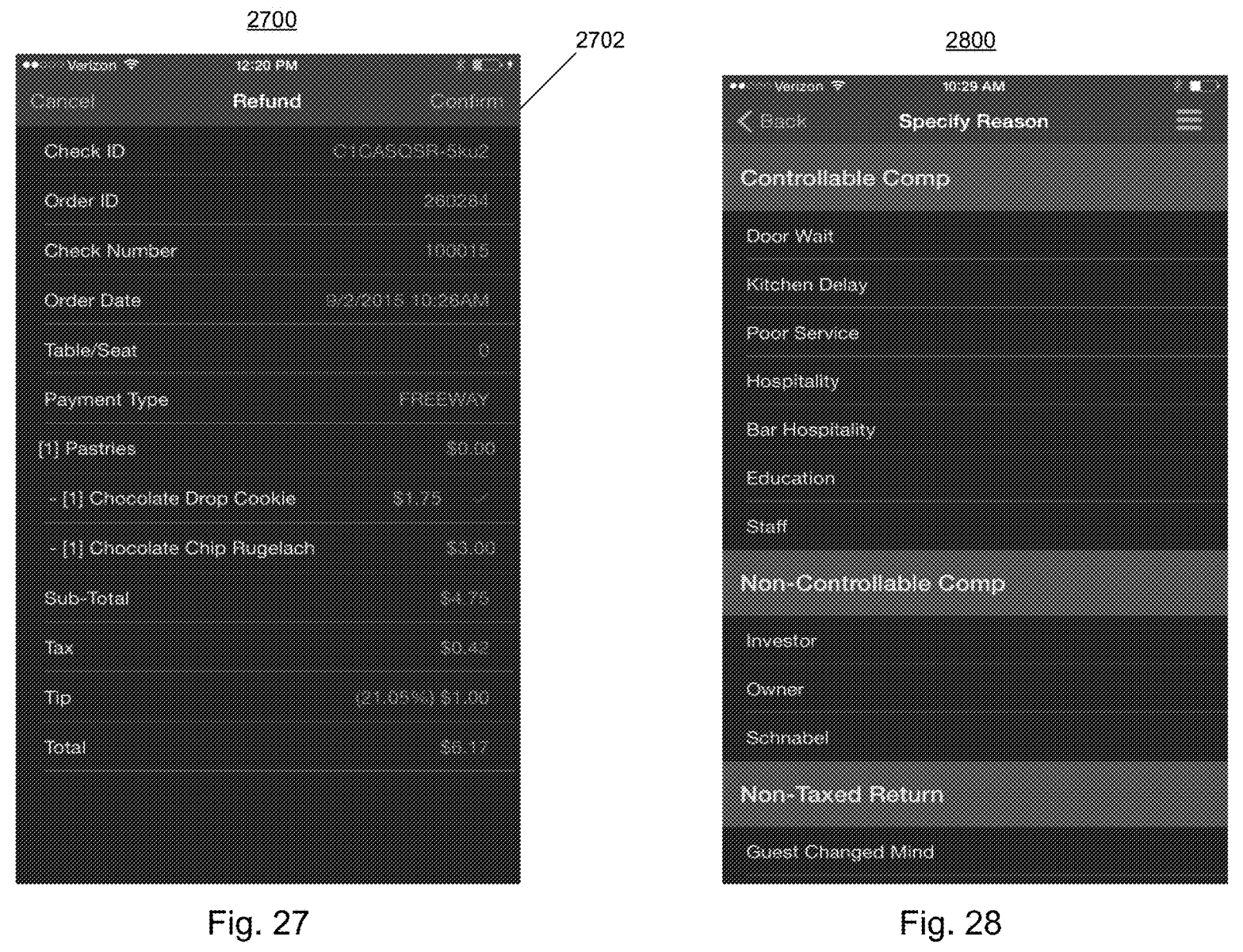
Figure 29A:
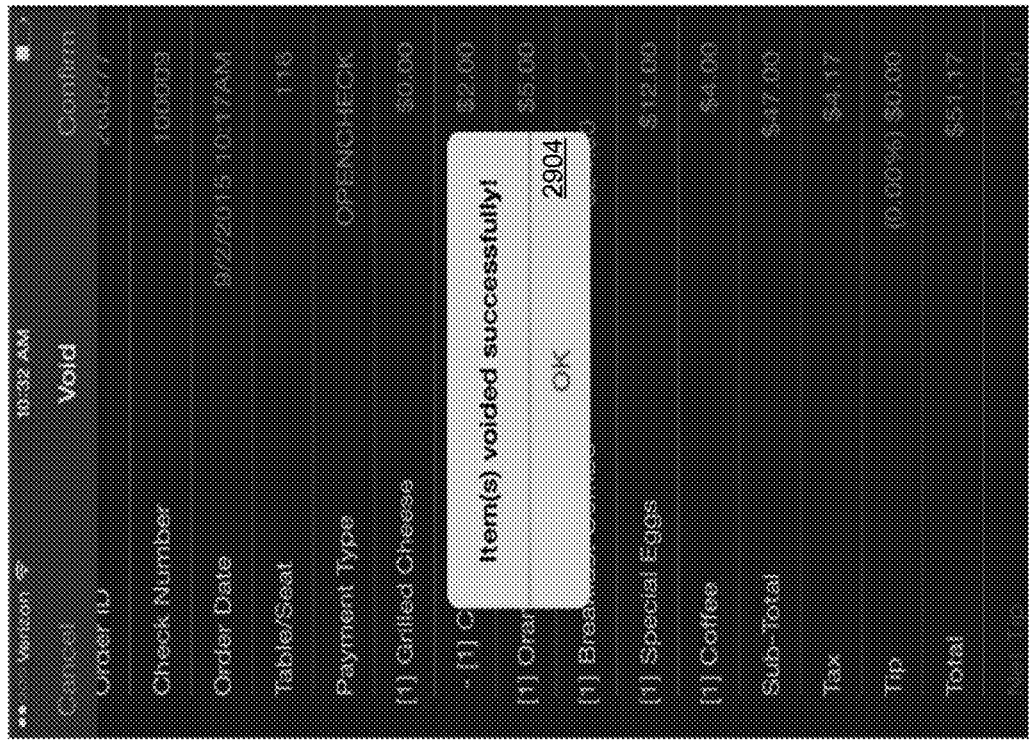
FIGS. 29A and 29B are a screen shots of example void pages.
Figure 29B:
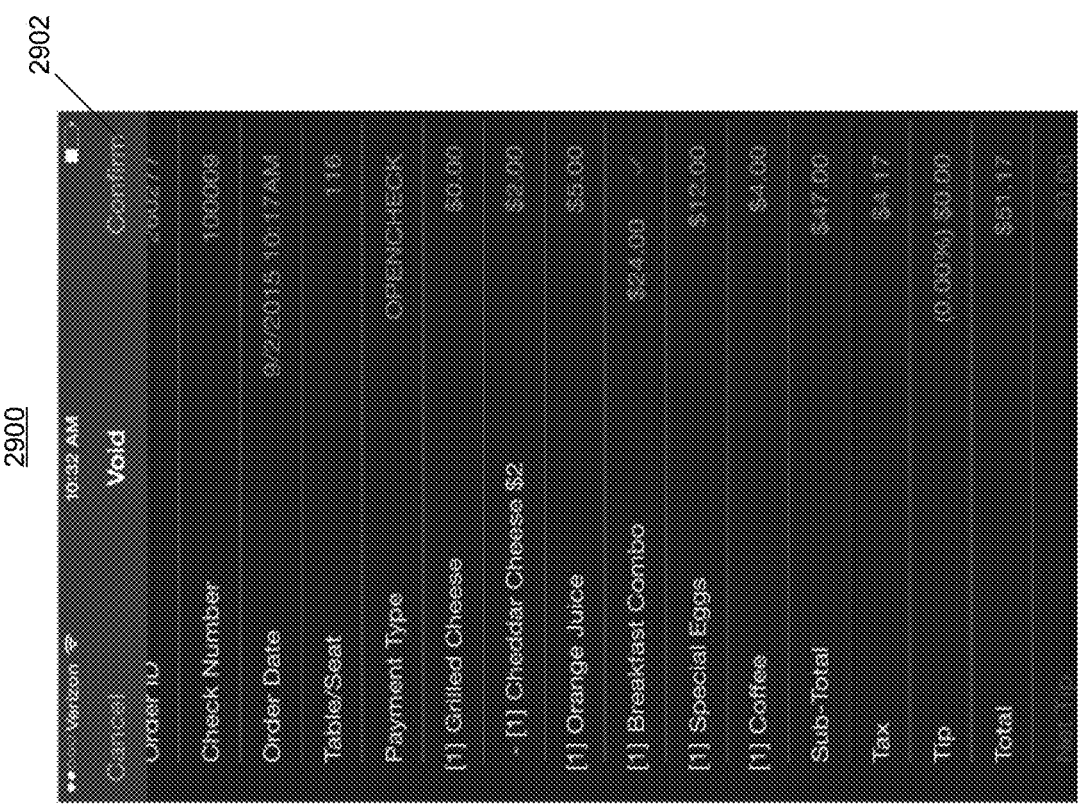
Figure 30:
FIG. 30 is a screen shot of an example discount page.

Referring to FIG. 27, an example refund page 2700 is depicted. The refund page 2700 may correspond to any check that has closed. A user may select individual items to refund. For example, items that are selected for refund may be indicated by a check mark on the refund page 2700. After a user has selected which items to refund, the user may select a confirm option 2702, and then a reason page 2800 (see FIG. 28) may be displayed. The reason page 2800 may display various reasons for the refund. In some cases, the user is required to select a reason. The user may be prompted to select a reason for the refund before proceeding with the refund. Referring to FIG. 29A, an example void page 2900 is shown. In contrast to the refund page 2700, the void page 2900 may correspond to any check that is open (not paid). A user may select individual items to void. After a user has selected which items to void, the user may select a confirm option 2902. In response, the user may be required to select a reason for the void via the reason page 2800. After the reason is selected and the confirm option is selected, a void confirmation 2904 may be displayed (see FIG. 29B). Referring to FIG. 30, an example discount page 3000 is depicted. The discount page 3000 may correspond to any check that is open (not paid). A user may select a percentage to discount a check. Although 50% and 100% are illustrated in the example discount page 3000, it will be understood that discounts are not limited to those percentages, and thus any discount can be displayed and selected as desired. After a user has selected a discount, the user may be required to select a reason for the discount via the reason page 2800.

Figure 31B:
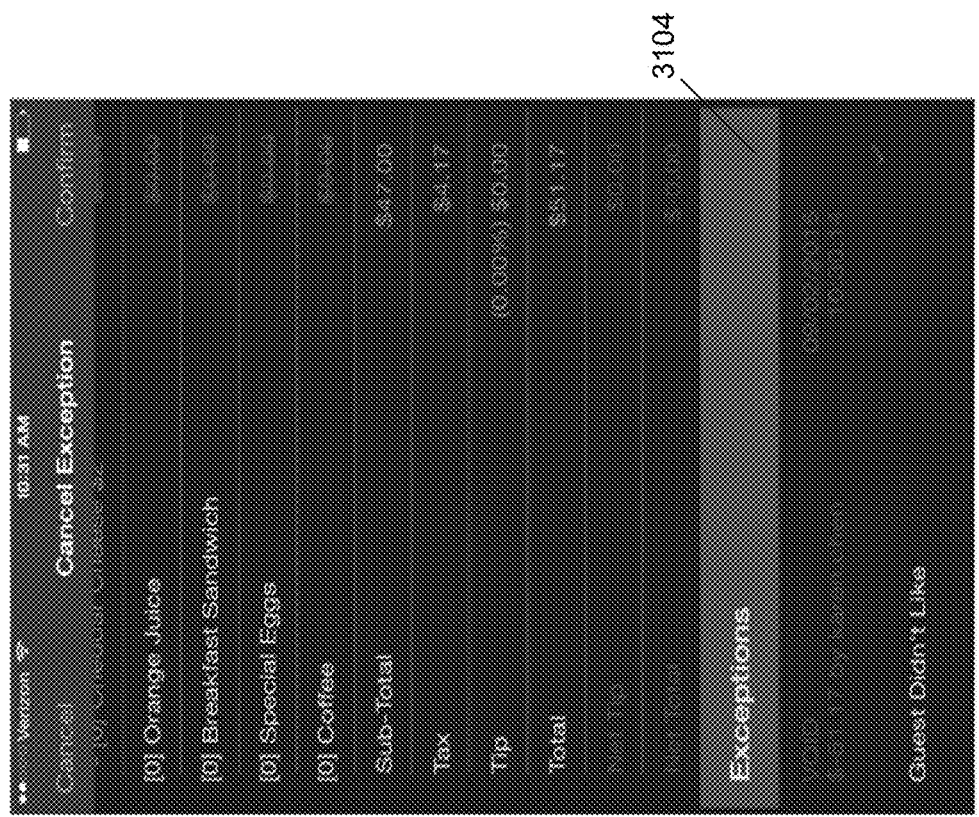
FIG. 31B is a screen shot of an example cancel exceptions page.
Figure 31A:
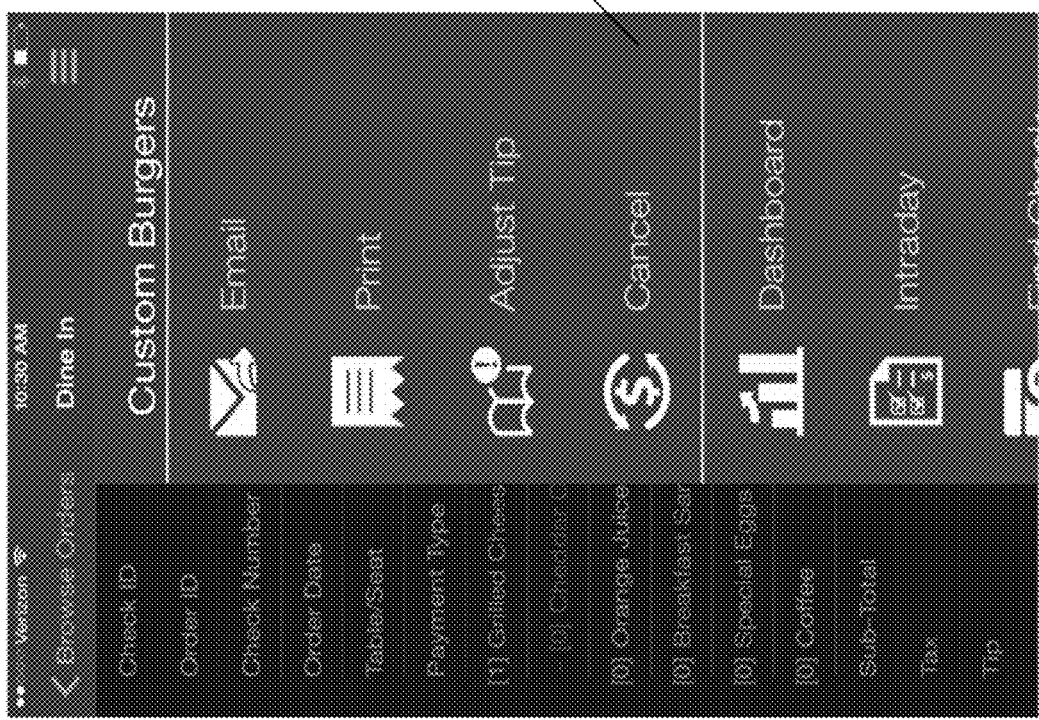
FIG. 31A is a screen shot of another example menu page.
Figure 31C:
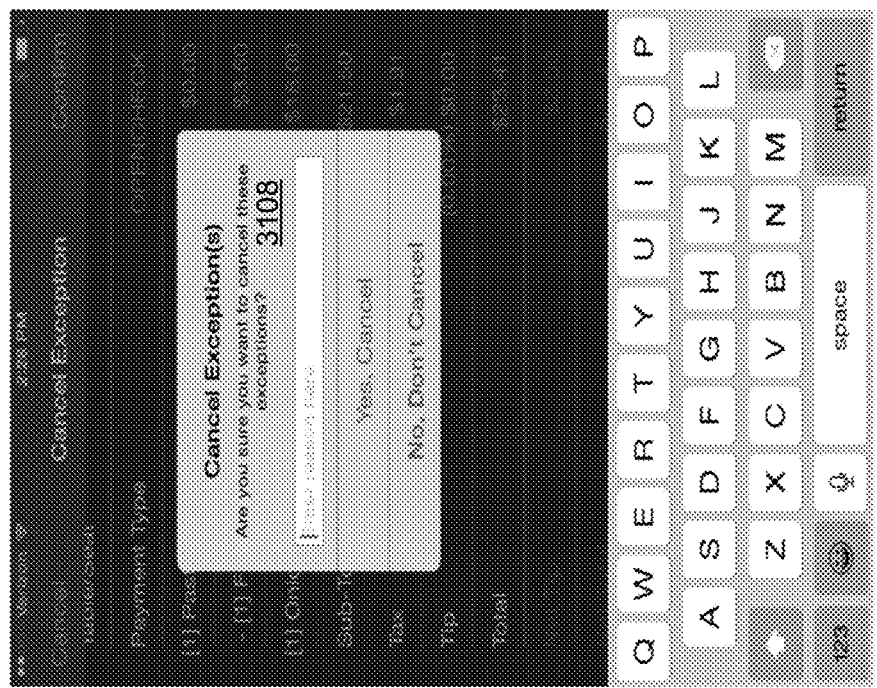
FIG. 31C is a screen shot that shows an example cancel reasons box.
Figure 33:
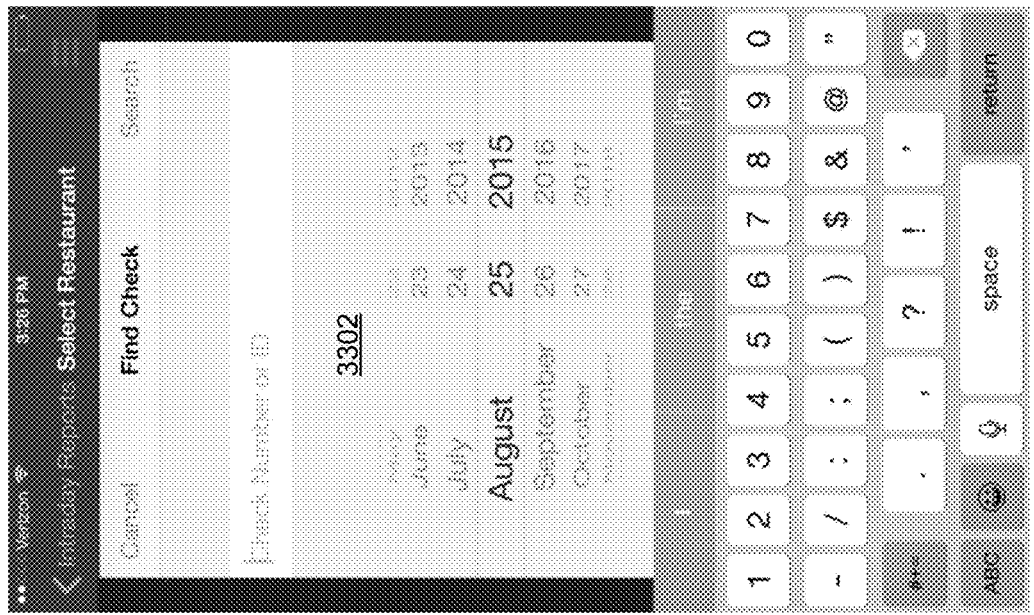
FIG. 33 is a screen shot of an example find check page.
Figure 32:
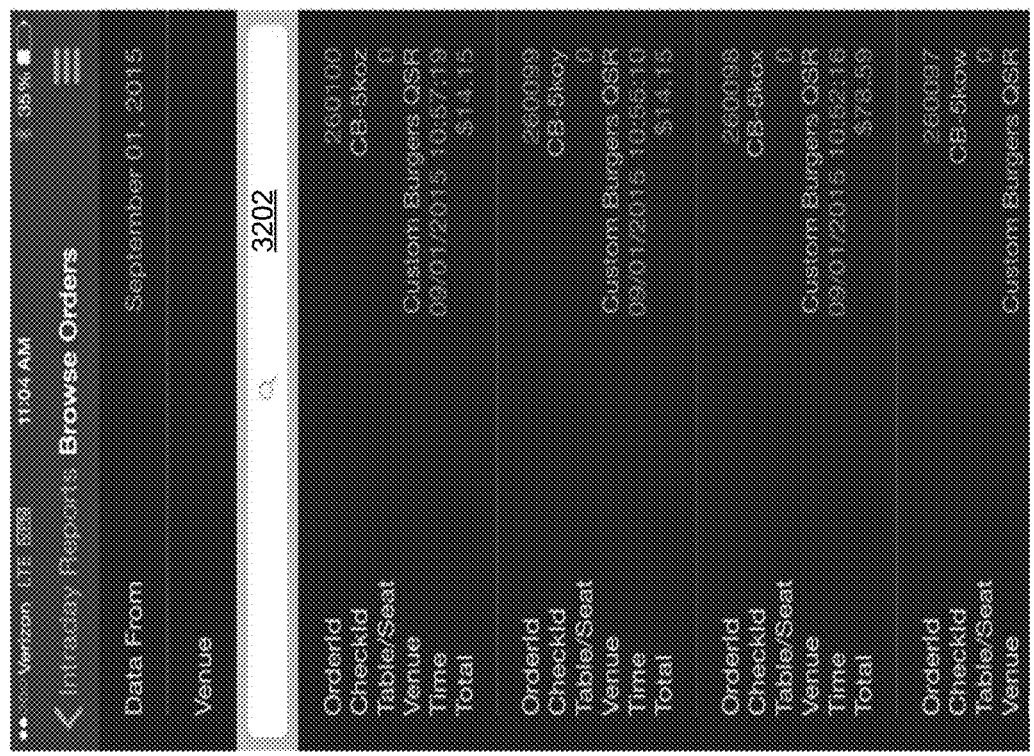
FIG. 32 is a screen shot of an example browse order page.

Turning now to canceling exceptions (e.g., voids, discounts, tip adjustments) to open checks, a user may select a cancel option 3102 on a menu page 3100 (see FIG. 31A). Referring to FIG. 31B, a list of exceptions 3104 may be displayed on a cancel exception page 3106. The user may select the exception from the list 3104 that should be canceled. In response, a cancel reason box 3108 may be displayed (see FIG. 31C). The user may be required to select a reason for the cancellation.

Figure 34:
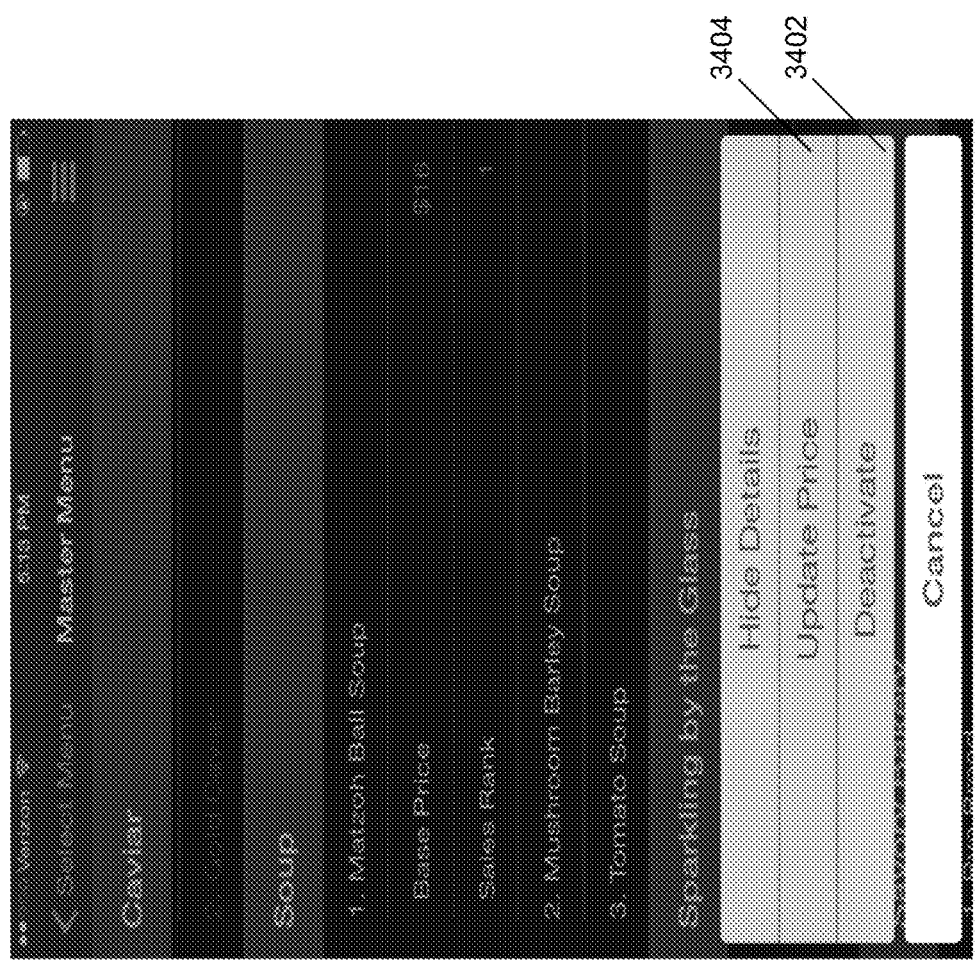
FIG. 34 is a screen shot of an example quick content management popup page.

In accordance with an example embodiment, a user can find specific orders via various mechanisms. For example, referring to FIG. 32, browse orders page 3200 may be displayed when a user selects intraday reports and browse orders from a main menu. The browser order page 3200 displays orders from that day. Alternatively, the user may search for a particular order (using a search bar 3202 of the browse orders page 3200) by entering keywords (e.g., table ID, order ID, price associated with the order, etc.) in the search bar 3202. Alternatively still, if a user has a physical receipt, the user can enter check number from the receipt into a find check page 3300 (see FIG. 33). Further, a user can scroll through a wheel 3302 on the find check page 3300 to select the appropriate date associated with the check. Referring to FIG. 34, a user may view a master menu page 3400 to make changes to a menu. For example, a user may de-activate items by selecting a deactivate option 3402, update prices by selecting an update price option 3404, or add items to a menu. Users may also use the master menu page 3400 to view sales and price rankings associated with each item.

Referring now to FIG. 5, in accordance with the illustrated embodiment, the self-payment system 106 can include an order processing device 126 that can communicate with computing devices 112 used by customers. FIG. 5 depicts one example of a suitable communication architecture for paying for an order, such as orders placed by the customers who may be in a restaurant or in an airport for example, it being appreciated that numerous suitable alternative communication architectures are envisioned. It will further be appreciated that the example system 106 is simplified to facilitate description of the disclosed subject matter and is not intended to limit the scope of this disclosure. Other devices, systems, and configurations may be used to implement the embodiments disclosed herein in addition to, or instead of, a system instead of the system 106, and all such embodiments are contemplated as within the scope of the present disclosure.

Customers can use the self-payment system 106 to add items to a virtual shopping cart and place an order for the added items from one of the devices 112, which can be a handheld wired or wireless order-placing device. The order can be received by the order processing device 126. The order processing device 126 can control and monitor various communication, for instance all communication, to and from one or more payment input devices 128, which can include credit card swiping/reading devices. The ordering processing device 126 can also automatically detect and correct problems that arise during a transaction, such as an ordering process described below with reference to FIG. 5. The ordering processing device 126 can also pass information to and from other devices and services securely at correct times during the order process. The order processing device 126 can be a standalone, single transactional device. Alternatively, the order processing device 126 can be integrated with additional devices, such as a USB hub 130 for example, so as to support multiple credit card swiping/reading devices.

With continuing reference to FIG. 5, an example ordering process is depicted. In accordance with the illustrated example, a customer uses the device 112 to select items to add to his/her virtual shopping cart. At 502, the customer submits the order. The order can be sent from the computing device 112 to the order processing device 126. At 504, in accordance with the illustrated example, the order processing device 126 can open communication to the payment input 128, which can be any available credit card swiping/reading device. At 506, the customer can be notified to present payment, for instance by swiping the credit card at the payment input 128. The order processing device 126 can receive credit card information from the payment input 128. At 508, the order processing device 126 can securely handle credit card information. In an example configuration in which there are multiple order processing devices 126 within the system 106, one or more servers 114 can log successful and unsuccessful transactions to identify market trends, potential systematic problems, and for other analytic purposes, at 510. For example, the servers 114 can store and retrieve historical and analytical information related to transactions at a database 134. In an example embodiment, personal information, such as credit card numbers for example, is not stored at the order processing device 126. Instead, at 512, credit card information can be sent to a credit card payment processor 132, via the network 110 which can be the Internet, from the order processing device 126. At 514, upon approval by the processor 132, an approval message can be sent to the order processing device 126 from the processor 132, via the network 110. At 516, the order processing device 126 can notify the customer of a successful payment, and connection between the device 112 and the order processing device can be disconnected from further communication. At 518, in accordance with the illustrated example, the order processing device 126 can pass virtual shopping cart information to an order fulfillment out device 136, such as a computing device in a kitchen of a restaurant for example. At 518, the order processing device 126 can also pass virtual shopping cart information to a printer 138 so that a customer receipt can be printed. In an example embodiment, limited customer details, such as the last four (4) digits of the credit card for example, are passed to the output device 136 and the printer 138. Further, in an example configuration in which there is multiple order processing devices 126 within the system 106, the order processing devices 126 can pass the virtual shopping cart information to the server 114, at 520, to address higher volume requirements for example.

Figure 7A:
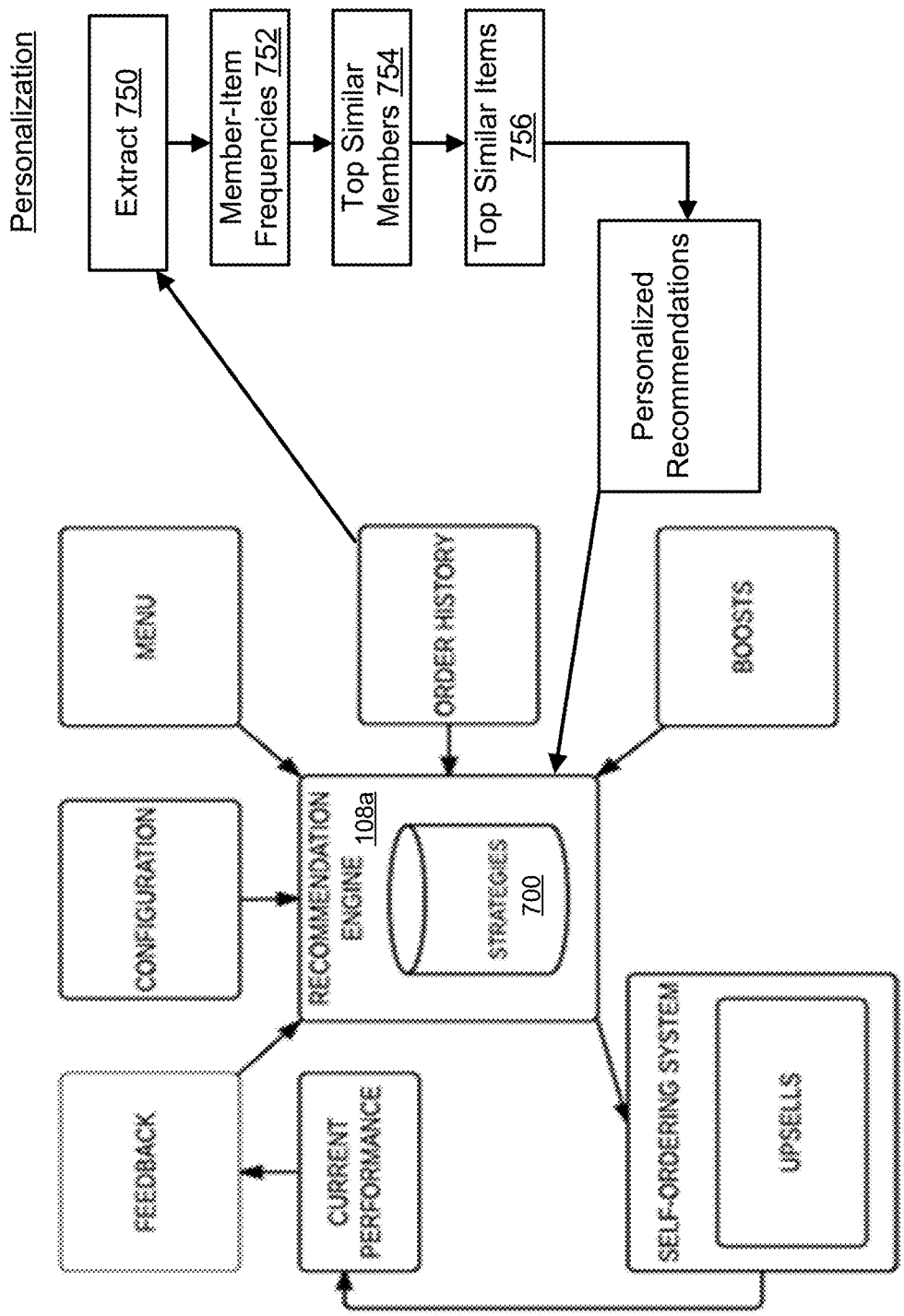
FIG. 7A depicts the recommendation engine and various inputs of the recommendation engine in accordance with an example embodiment.

Referring generally to FIGS. 1 and 2, and in particular to FIGS. 7A and 7B, the recommendation engine 108a will now be described in greater detail in accordance with an example embodiment. The recommendation engine 108a can supply the customer device 112, and in particular the client application, with suggested items for a customer to purchase. The recommendation engine 108a can increase sales by recommending upsells, which can be items within the menu that have a high likelihood of being purchased as determined by previous items the customer purchased. The engine 108a can return a predetermined number of recommendations according to desired criteria. Example criteria include, but are not limited to, a meal status (e.g., completion), flight destination history, item restrictions (vegetarian, children, etc.), item purchase history, and recommendation performance history. Thus, an order history associated with a customer, a menu, and a configuration can be received by the recommendation engine 108a. The configuration refers to how menu items are organized in accordance with an example embodiment. Items can be displayed within a category or groups of categories. Items can also be associated with a slot, such as an entrée or appetizer for example.

As described with reference to FIGS. 2 and 8A-C, for example, a customer can view a menu in an example restaurant implementation of the ordering system 102. The menu can include items that have been recommended by the recommendation engine 108a displayed more prominently on the user device 112 as compared to items that are not recommended. The recommendation engine 108a may have access to an order history of a customer. The order history may include items ordered by a particular customer, most popular items ordered at a particular time, most popular items ordered at a particular restaurant, or the like, or any appropriate combination thereof. The recommendation engine 108a may include one or more strategies 700. The strategies 700 may be an algorithm or set of algorithms that determines which items are presented to a particular user as an upsell. Multiple strategies 700 may be implemented at once.

Figure 7B:
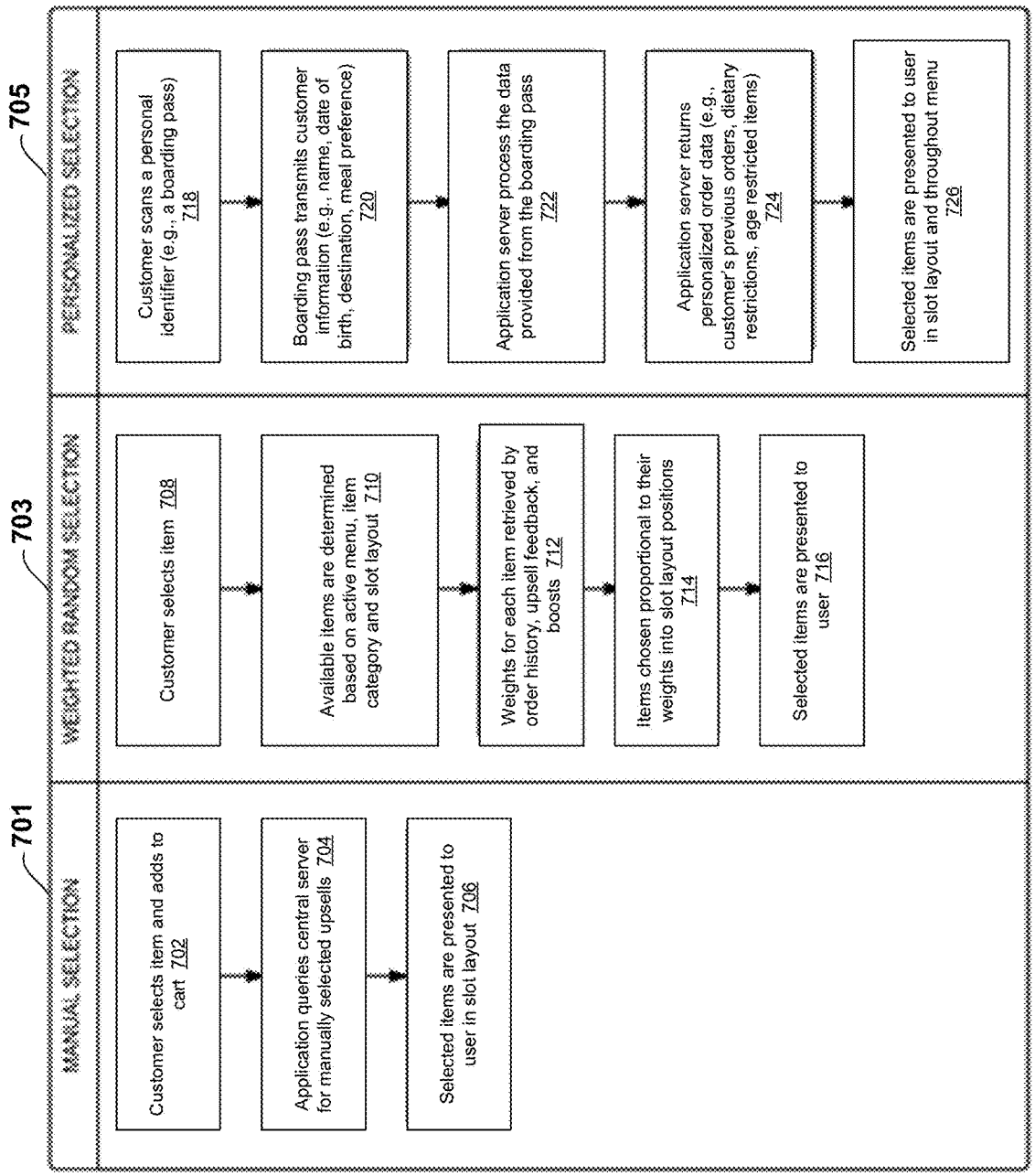
FIG. 7B depicts various example methods that can be performed by the recommendation engine.

In an example, referring in particular to FIG. 7B, a manual upsell 701 is implemented. In an example manual upsell implementation, items are preselected to be presented as upsells for a specific menu item. For example, when a customer selects an item at 704 and adds it to a virtual cart, the device 112 of the customer, and in particular the client application, can query the server 114 (e.g., see FIG. 2) for items (upsells) that are associated with the selected item (706). At 708, the upsells that were preselected as being associated with the selected item can be displayed in a slot layout for purchase by the customer.

Still referring to FIG. 7B, in another example, a weighted random selection strategy 703 is implemented by the recommendation engine 108a. For example, at 708, a given customer selects an item and adds the selected item to a virtual cart. At 710, available items are determined based on an active menu, a category associated with the item, and a slot layout. When a given customer selects an item and adds the selected item to a virtual cart, the device 112 of the customer, and in particular the client application, can query the server 114 (e.g., see FIG. 2) for other items that were previously ordered with the selected item. The server 114 can further be queried to determine which items were previously purchased by customers who are boarding the same flight as the given customer. The server 114 can answer the queries, and can thus identify one or more items that match the queries. The matched items for the queries can be ranked or weighted. By way of example, and without limitation, the matched items can be given a weight according to the frequency with which the items were ordered with other items and/or the frequency with which items were ordered by customers associated with particular flight destinations. The weights can be ranked for the available items. At 712, the recommendation engine 108a retrieves weights associated with each of the available items. Weights may be retrieved based on order history, upsell feedback, and boosts. Upsell feedback may indicate a rate at which items were ordered when they were upsold. Such a rate may be referred to as a success rate. In particular, to determine the success rate or conversion rate, the number of times that an item was presented to a customer as a recommendation can be compared to the number of times that the item was purchased as result of the recommendation. Conversion rates may be captured and calculated periodically, for instance daily. The conversion rates can be delivered to the recommendation engine 108a in the form of weights so as to be included in the strategies 700. Thus, for example, items that sell strongly, but do not sell strongly when they are recommended as upsells, will be weighted less and thus upsold less frequently. Boosts refer to adjusting, for instance temporarily, a weight of an item. Weights can be boosted up or down, for instance by an absolute percentage or a relative amount. Boosts can be applied based on a variety of parameters. For example, boosts may be applied based on time of day or season of year.

Still referring to FIG. 7B, in accordance with the illustrated weighted random example, at 714, matched items can be selected at random in proportion to their weights so as to define the upsells, thereby increasing the chance that the recommended items are those items that are most likely to be sold with the selected item, while also presenting various other items for purchase. At 716, the randomly selected items can be displayed (e.g., by a device 112) in a slot layout for purchase by the customer.

In another example, a personalized selection strategy 705 is implemented by the recommendation engine 108a. The personalization selection strategy 705 may allow a given customer's preferences to be identified through repeat purchases. For example, favorite brands, food categories, dietary restrictions or preferences, and like, which are associated with a given customer may be identified. Personalization may also enable collaborative filtering. In this implementation, a purchase history of a given customer may be compared to the purchase history of all other customers to find items that customers who are similar to the given customer have purchased. In accordance with the illustrated example, at 718, a given customer can scan a personal identifier, such as a boarding pass for example, into the device 112 of the customer. Various personal information can be associated with the personal identifier. Example personal information that can be associated with the personal identifier can include, but is not limited to, name of the customer, date of birth, destination of the customer, meal preferences of the customer, a member id of an airline loyalty program, and the like. At 720, the device 112, as also described above, can send the personal information to the server 114, such that, for example, an order history that is associated with the customer can be recalled. At 722, the server 114 can process the received personal information, which can be data associated with a boarding pass, a credit card, or an government issued ID for example. At 722, the server 114 selects items and returns order data that is specific (personalized) to the given customer. Example personalized data includes, but is not limited to, previous orders of the customer, dietary restrictions of the customer, age of the customer, items that are restricted from the customer (e.g., alcohol for an underage customer). The selected items that can be upsold can correspond to the personalized data. At 726, the selected items can be displayed in a slot layout for purchase by the customer. Thus, items can be upsold to a customer even though the customer has not logged into an account.

In one example, the personal identifier referenced above is the only information that the recommendation engine 108a receives from a customer. For example, if the personal identifier comprises a boarding pass, the recommendation engine 108a can identify a person by the boarding pass, and can determine previous purchases that the identified person has made. If the identified person has no transaction history, the recommendation engine 108a will gather the data associated with the person's first purchase. In an example, a unique customer identifier may be associated with historical purchases made by a given customer. The identifier can be used to identify a repeat customer during a subsequent transaction. As described above, in one example, boarding passes are scanned to identify a member ID (e.g., loyalty program ID) that identifies the current customer. Any purchases made via any payment method, such as a mileage redemption, credit card, or the like, are associated with the member ID. This association may be attached to every historical transaction where appropriate. Therefore, even if a given customer has no previous transactional history, the current purchase will begin a transactional history of the given customer. In some cases, data is gathered periodically, for instance daily, to determine which items were purchased by whom. Referring to FIG. 7B, at 750, purchase data can be extracted daily from the operations management system 100. Extracted data can include, for example and without limitation, a member ID, a venue name associated with purchases, a menu item name that was purchased, a quantity of the menu item that was purchased, and a date of the purchase. Data Menu items can be given general names so that data can be gathered across venues (e.g., different restaurants).

In an example embodiment, at 752, orders are converted into a per member item frequency list that indicates how many times each customer ordered an item. The orders may be classified by the member ID associated with the customer, a normalized name of the ordered menu item, and a total quantity of the menu item that was ordered by the customer. In some cases, the members (customers) and the respective menu items that were ordered are consolidated into a single M×I matrix. Using the matrix, at 754, similarity is calculated for every member against every other member to determine a list of members that are most similar to a given customer. By way of example, a given customer (target customer) may be associated with 100 other customers who are most similar to the given customer. Items purchased by each member that is similar to a target customer may combined together to determine a list of top items that are associated with the target customer, at 756. The list of top items may include, for example and without limitation, a member ID (of the target customer), a menu item that is normalized (e.g., generic or not specific to a particular store or restaurant), and a rank associated with the menu item. The rank may indicate the item's popularity among members that are similar to the target customer. In some cases, the rank may indicate how many times the similar members have ordered the menu item. The above-described periodic data analysis may result in new recommendations being made to a particular customer or set of customers. For example, after the above-described process is performed, members may have new or different similar members, new or different menu item associations, or new or different ranks associated with menu items.

As described above, during ordering or when a member ID is available via a boarding pass scan, the personalized member item recommendations can be added. For instance, the recommendations can be rendered on the device of the customer to prompt the customer to consider purchasing the recommended items. By way of example, if a slot is open for a beer, the list of personalized recommendations associated with the target customer are checked for beers, and the top ranked item is selected for rendering in the available slot. Therefore, customers may see items they themselves have selected earlier along with items that other similar members have selected.

FIG. 6A is a block diagram of an example computing system 620 that may also be used to implement one or more nodes of a network, such as the clients, servers, engines, or devices illustrated in FIGS. 1-5. Computing system 620 may comprise a computer or server and may be controlled primarily by computer readable instructions, which may be in the form of software, wherever, or by whatever means such software is stored or accessed. Such computer readable instructions may be executed within central processing unit (CPU) 659 to cause computing system 620 to do work. In many known workstations, tablets, servers, and personal computers, central processing unit 659 is implemented by a single-chip CPU called a microprocessor. In other machines, the central processing unit 659 may comprise multiple processors. Coprocessor 660 is an optional processor, distinct from main CPU 659, which performs additional functions or assists CPU 659. CPU 659 and/or coprocessor 660 may receive, generate, and process data related to the disclosed systems and methods for operations management, such as receiving orders or fulfilling orders.

In operation, CPU 659 fetches, decodes, and executes instructions, and transfers information to and from other resources via the computer's main data-transfer path, system bus 621. Such a system bus connects the components in computing system 620 and defines the medium for data exchange. System bus 621 typically includes data lines for sending data, address lines for sending addresses, and control lines for sending interrupts and for operating the system bus. An example of such a system bus 621 is the PCI (Peripheral Component Interconnect) bus.

Memory devices coupled to system bus 621 include random access memory (RAM) 661 and read only memory (ROM) 623. Such memories include circuitry that allows information to be stored and retrieved. ROMs 623 generally contain stored data that cannot easily be modified. Data stored in RAM 661 can be read or changed by CPU 659 or other hardware devices. Access to RAM 661 and/or ROM 623 may be controlled by memory controller 622. Memory controller 622 may provide an address translation function that translates virtual addresses into physical addresses as instructions are executed.

In addition, computing system 620 may contain peripherals controller 635 responsible for communicating instructions from CPU 659 to peripherals, such as printer 612, keyboard 651, mouse 652, and disk drive 639.

Display 642, which is controlled by display controller 632, is used to display visual output generated by computing system 620. Such visual output may include text, graphics, animated graphics, and video. Display 642 may be implemented with a CRT-based video display, an LCD-based flat-panel display, gas plasma-based flat-panel display, or a touch-panel. Display controller 632 includes electronic components required to generate a video signal that is sent to display 642.

Further, computing system 620 may contain communication circuitry, such as for example a network adaptor 637 that may be used to connect computing system 620 to an external communications network, such as network 110 of FIG. 5 for example, to enable the computing system 620 to communicate with other nodes of the network. The communication circuitry, alone or in combination with the CPU 91, may be used to perform the transmitting and receiving steps described herein (e.g., in FIGS. 2-5, and 7B) and in the claims.

As described above, in accordance with an example embodiment, a processor can perform various operations including receiving information associated with a customer. Based on the information associated with the customer, a menu that is specific to the customer can be generated. The menu can include one or more items that can be purchased by the customer. The operations can further include receiving an order that includes at least one selected item of the one or more items. The operations can further include identifying a delivery station disposed proximate to the customer, and sending a request to the identified delivery station. The request can be indicative of the at least one selected item and a location associated with the customer. The operations can further include receiving a verification when the at least one selected item is delivered to the customer. The above-described information that is associated with the customer can include a flight status, and, based on the flight status, an alert can be sent to a computing device of the customer. Further, in an example embodiment, in response to receiving the order, the operations can include identifying a preparation station that corresponds to the at least one selected item. A preparation request can be sent to the identified preparation station. In an example embodiment, identified preparation station is one of a plurality of preparation stations, and the preparation request is only sent to the identified preparation station. The operations performed by the process can further include receiving an assistance request, wherein the assistance request can be indicative of a second location associated with a second customer. The assistance request can be displayed, and the processor can determine that the assistance request has been satisfied. In response to determining that the assistance request has been satisfied, the operations can include removing the assistance request from a display.

As is apparent from the embodiments described herein, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., computer executable instructions). This program code may be stored on a computer-readable storage medium, such as a magnetic, electrical, or optical storage medium, including without limitation a floppy diskette, CD-ROM, CD-RW, DVD-ROM, DVD-RAM, magnetic tape, flash memory, solid-state drive, hard disk drive, or any other machine-readable storage medium, wherein, when the program code is loaded into and executed by a machine, such as a computer or server, the machine becomes an apparatus for practicing the invention. A computer on which the program code executes may include a processor, a storage medium readable by the processor (including volatile and/or non-volatile memory and/or storage elements), at least one input device, and/or at least one output device. The program code may be implemented in a high level procedural or object oriented programming language. Alternatively, the program code may be implemented in an assembly or machine language. In any case, the language may be a compiled or interpreted language. When implemented on a general-purpose processor, the program code may combine with the processor to provide a unique apparatus that operates analogously to specific logic circuits. As used herein, the terms "computer-readable medium" and "computer-readable storage medium" do not include a transient signal. As used herein, the terms "computer-readable medium" and "computer-readable storage medium" do not include a propagating signal. As used herein, the terms "computer-readable medium" and "computer-readable storage medium" do not include a signal. As used herein, the terms "computer-readable medium" and "computer-readable storage medium" refer to media have a tangible, physical, concrete structure, as opposed to a signal that does not have a tangible, physical, concrete structure.

When the above described operations management system 100 is implemented in a restaurant, it can reduce the amount of time that customers spend in the restaurant as compared to restaurants that do not implement the operations management system 100. For example, traditional service steps can be eliminated by the ordering system 102 and/or the fulfillment system 104. In particular, time need not be spent finding a staff member for assistance using the operations management system 100. Further, the payment system 106 can reduce the amount of time spent paying. Further still, the fulfillment system 104 can reduce time that wait staff spends communicating with the kitchen staff and inputting orders.

As the foregoing illustrates, the present invention is directed to systems, methods, and apparatus for placing orders and delivering orders in an application-based environment. Changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed:

1. A system comprising:
one or more processors; and
memory coupled to the one or more processors, the memory comprising executable instructions that when executed by the one or more processors cause the one or more processors to effectuate operations comprising:
receiving information associated with a user from a computing device of the user;
based on the information associated with the user, generating a menu specific to the user, the menu including one or more items;
receiving a first message that includes a first item of the one or more items;
determining that the first message is received within a predetermined time during which a second message that includes a second item is received;
identifying one of a plurality of delivery station devices disposed closest to the user;
based on the first and second messages being received within the predetermined time relative to each other, sending a delivery request to the identified delivery station device only when both the first and second items are ready, the delivery request indicating a respective location associated with the first and second items; and
receiving a verification when the first and second items are delivered by a second user of the identified delivery station device.

2. The system as recited in claim 1, wherein the information associated with the user includes a flight status, the operations further comprising:
based on the flight status, sending an alert to the computing device of the user.

3. The system as recited in claim 1, the operations further comprising:
in response to receiving the first and second messages, identifying a preparation station that corresponds to the first and second items, respectively.

4. The system as recited in claim 3, the operations further comprising:
sending a preparation request to the identified preparation station.

5. The system as recited in claim 4, wherein the identified preparation station is one of a plurality of preparation stations, the operations further comprising:
sending the preparation request to only the identified preparation station.

6. The system as recited in claim 1, the operations further comprising:

receiving an assistance request, the assistance request indicative of a second location associated with a third user;

displaying the assistance request; and determining that the assistance request has been satisfied.

7. The system as recited in claim 6, the operations further comprising:

in response to determining that the assistance request has been satisfied, removing the assistance request from a display.

8. A computer-readable storage medium comprising executable instructions that when executed by a least one processor cause the processor to effectuate operations comprising:

receiving information associated with a user from a computing device of the user;

based on the information associated with the user, generating a menu specific to the user, the menu including one or more items;

receiving a first message that includes a first item of the one or more items;

determining that the first message is received within a predetermined time during which a second message that includes a second item is received;

identifying one of a plurality of delivery station devices disposed closest to the user;

based on the first and second messages being received within the predetermined time relative to each other, sending a delivery request to the identified delivery station device only when both the first and second items are ready, the delivery request indicating a respective location associated with the first and second items; and receiving a verification when the first and second items are delivered by a second user of the identified delivery station device.

9. The computer-readable storage medium as recited in claim 8, wherein the information associated with the user includes a flight status, the operations further comprising:

based on the flight status, sending an alert to the computing device of the user.

10. The computer-readable storage medium as recited in claim 8, the operations further comprising:

in response to receiving the first and second messages, identifying a preparation station that corresponds to the first and second items, respectively.

11. The computer-readable storage medium as recited in claim 10, the operations further comprising:

sending a preparation request to the identified preparation station.

12. The computer-readable storage medium as recited in claim 11, wherein the identified preparation station is one of a plurality of preparation stations, the operations further comprising:

sending the preparation request to only the identified preparation station.

13. The computer-readable storage medium as recited in claim 8, the operations further comprising:

receiving an assistance request, the assistance request indicative of a second location associated with a third user;

displaying the assistance request; and determining that the assistance request has been satisfied.

14. The computer-readable storage medium as recited in claim 13, the operations further comprising:

in response to determining that the assistance request has been satisfied, removing the assistance request from a display.

15. A computer-implemented method comprising:

receiving information associated with a user from a computing device of the user;

based on the information associated with the user, generating a menu specific to the user, the menu including one or more items;

receiving a first message that includes a first item of the one or more items;

determining, by a server, that the first message is received within a predetermined time during which a second message that includes a second item is received;

identifying, by the server, one of a plurality of delivery station devices disposed closest to the user;

based on the first and second messages being received within the predetermined time relative to each other, sending a delivery request to the identified delivery station device only when both the first and second items are ready, the delivery request indicating a respective location associated with the first and second items; and receiving a verification when the first and second items are delivered by a second user of the identified delivery station device.

16. The method as recited in claim 15, wherein the information associated with the user includes a flight status, the method further comprising:

based on the flight status, sending an alert to the computing device of the user.

17. The method as recited in claim 15, the method further comprising:

in response to receiving the first and second messages, identifying a preparation station that corresponds to the first and second items, respectively.

18. The method as recited in claim 17, the method further comprising:

sending a preparation request to the identified preparation station.

19. The method as recited in claim 18, wherein the identified preparation station is one of a plurality of preparation stations, the method further comprising:

sending the preparation request to only the identified preparation station.

20. The method as recited in claim 15, the method further comprising:

receiving an assistance request, the assistance request indicative of a second location associated with a third user;

displaying the assistance request; and determining that the assistance request has been satisfied.

21. The method as recited in claim 20, the method further comprising:

in response to determining that the assistance request has been satisfied, removing the assistance request from a display.

* * * * *